March 15, 1938. W. F. BIRD ET AL 2,111,525
LOOM
Filed Oct. 30, 1934 17 Sheets-Sheet 4
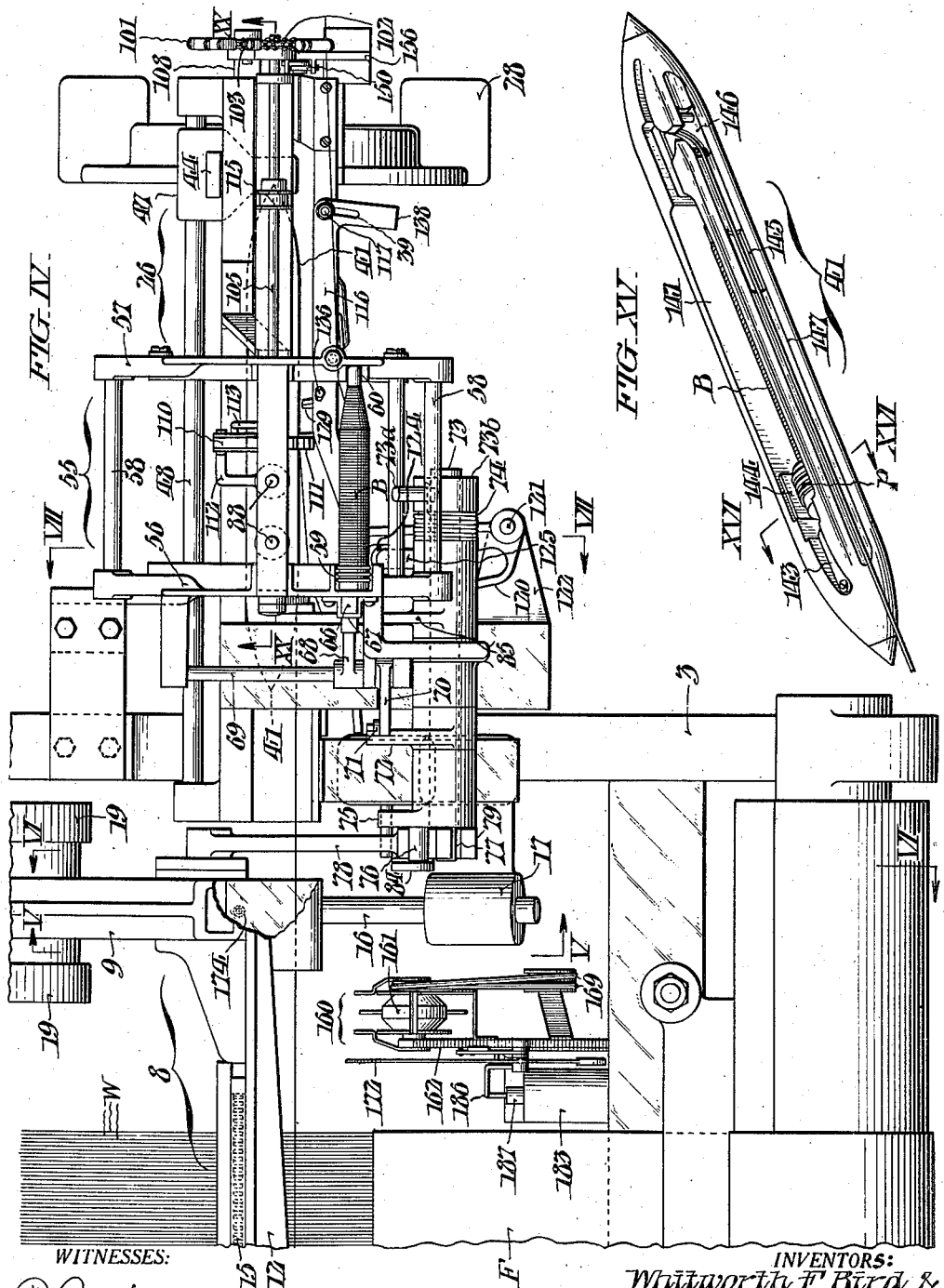

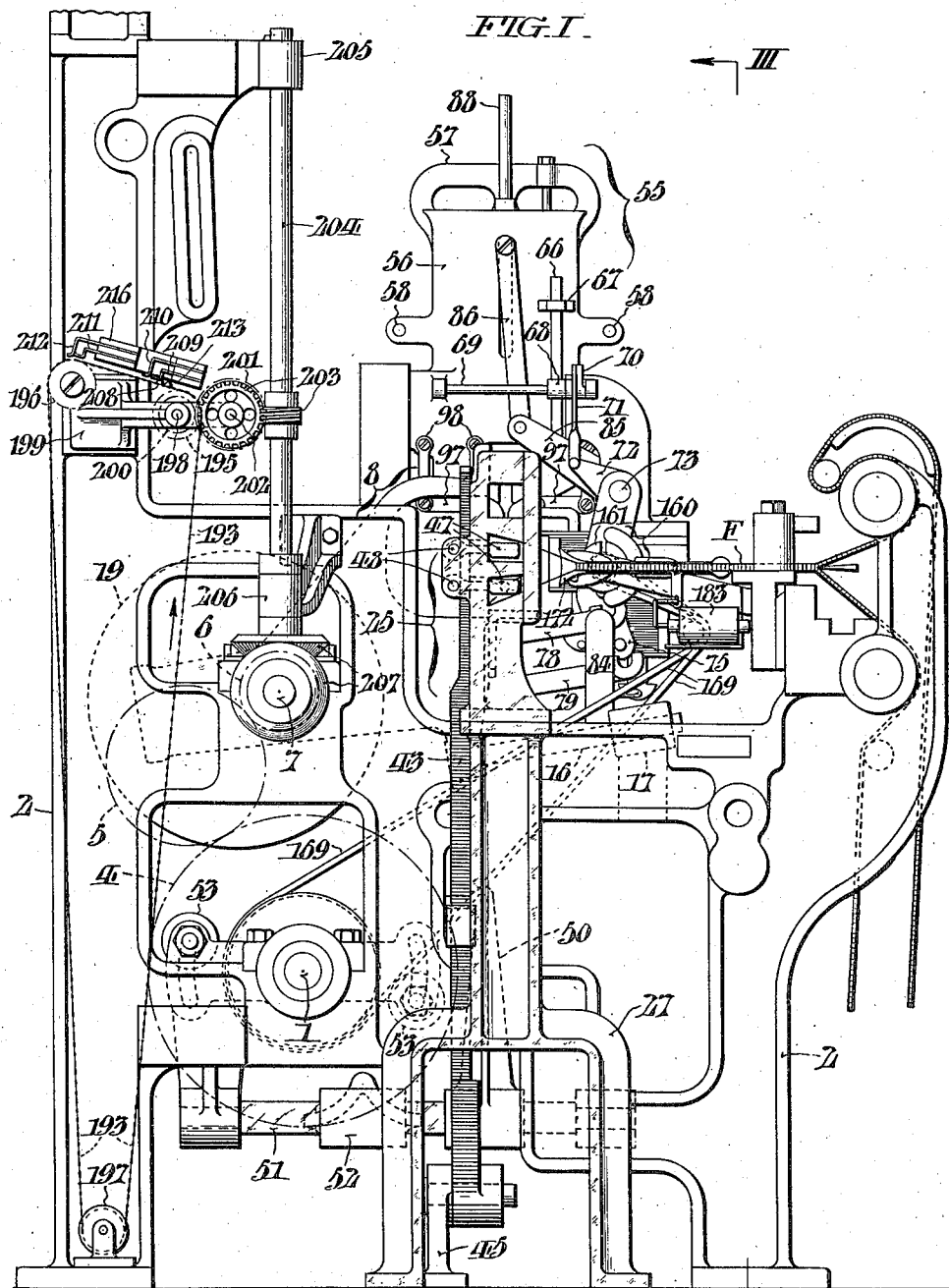

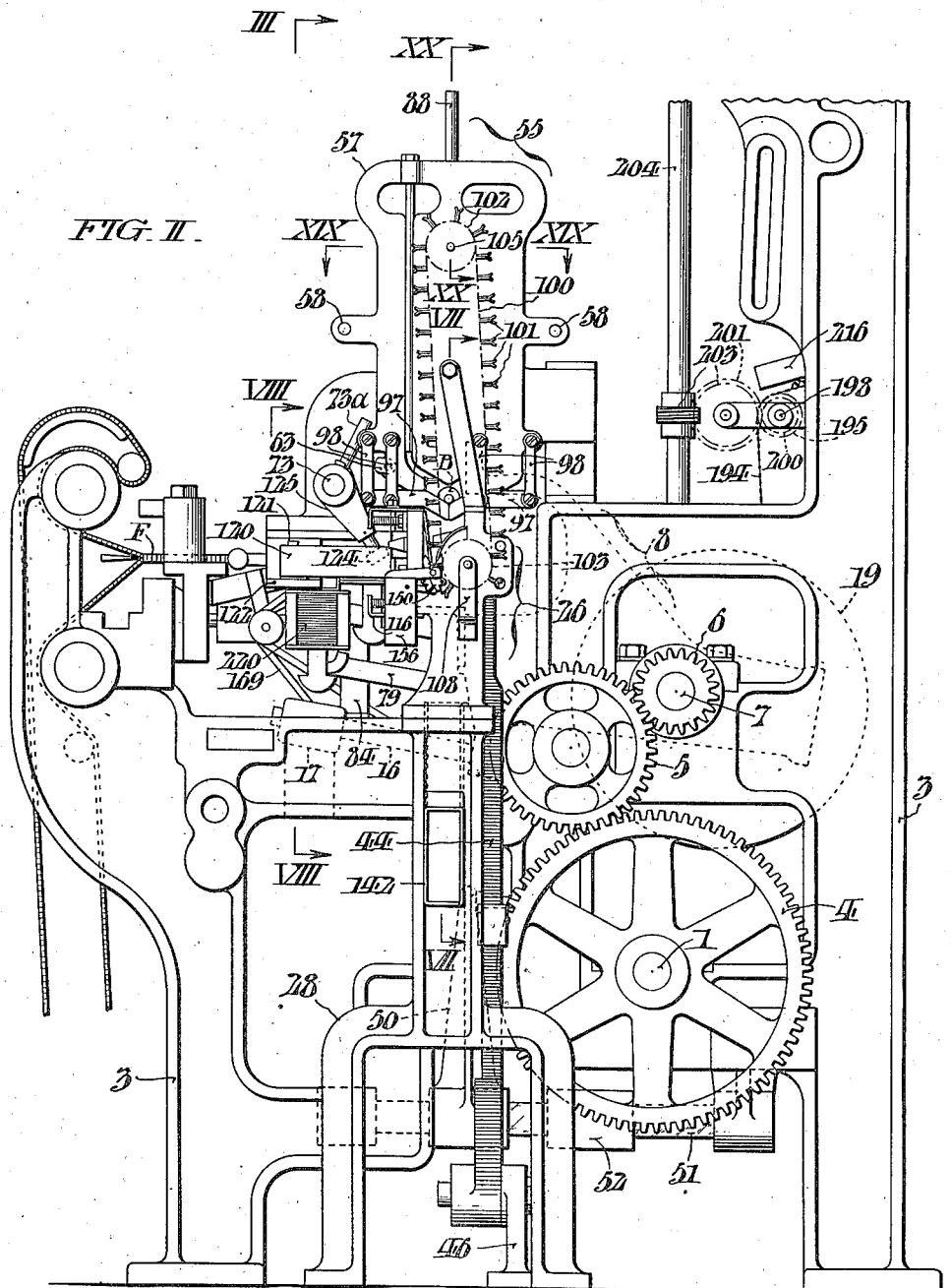

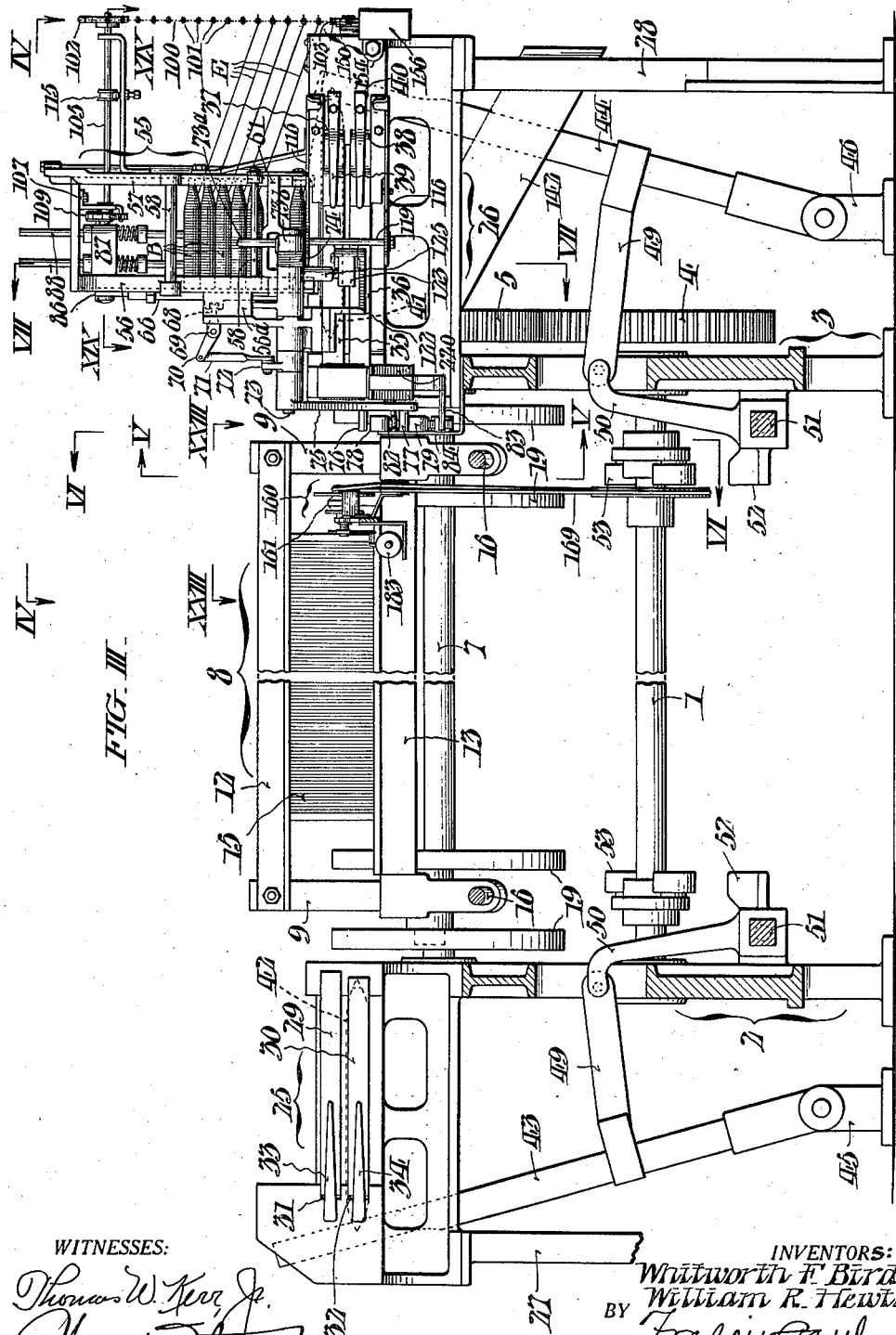

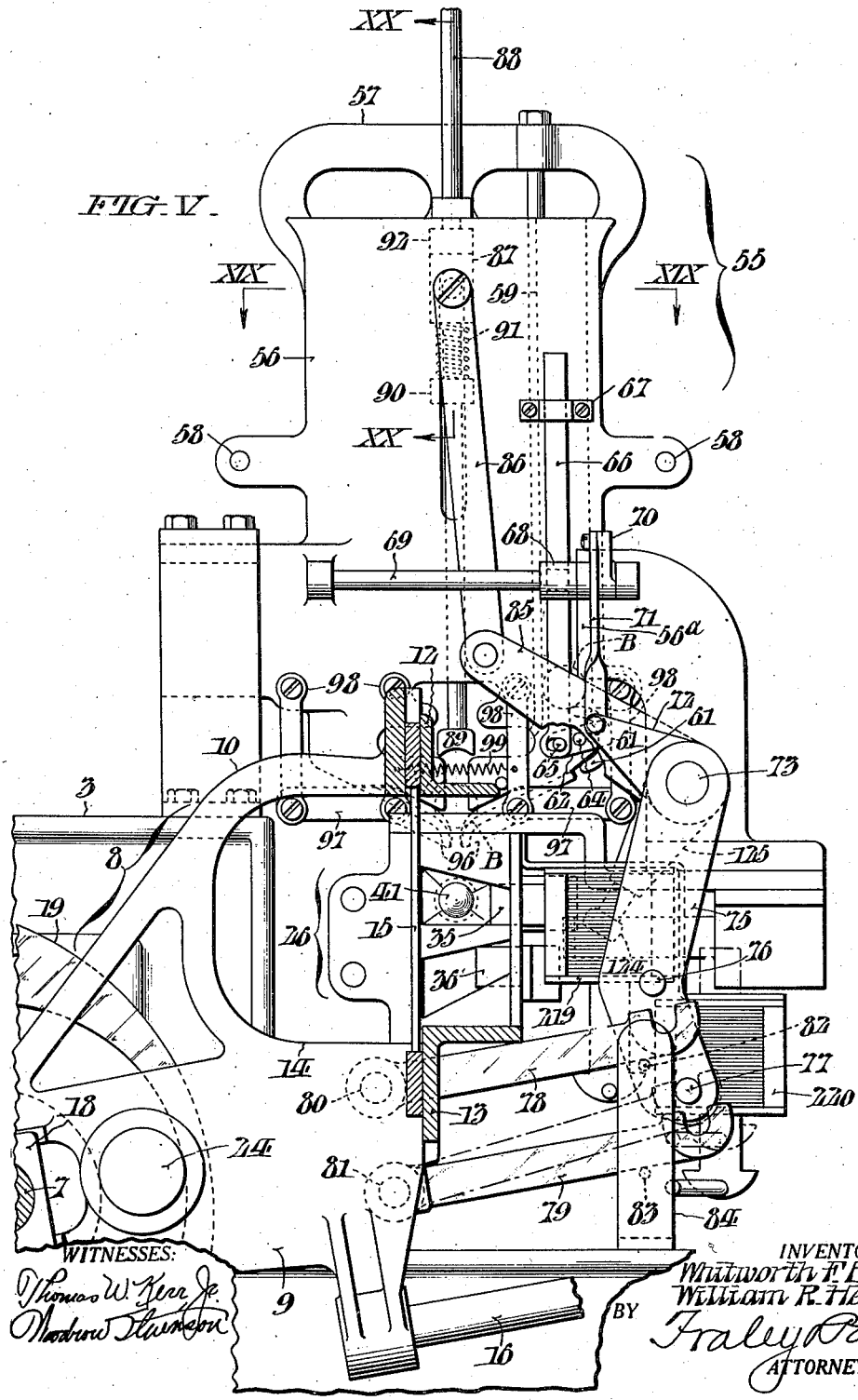

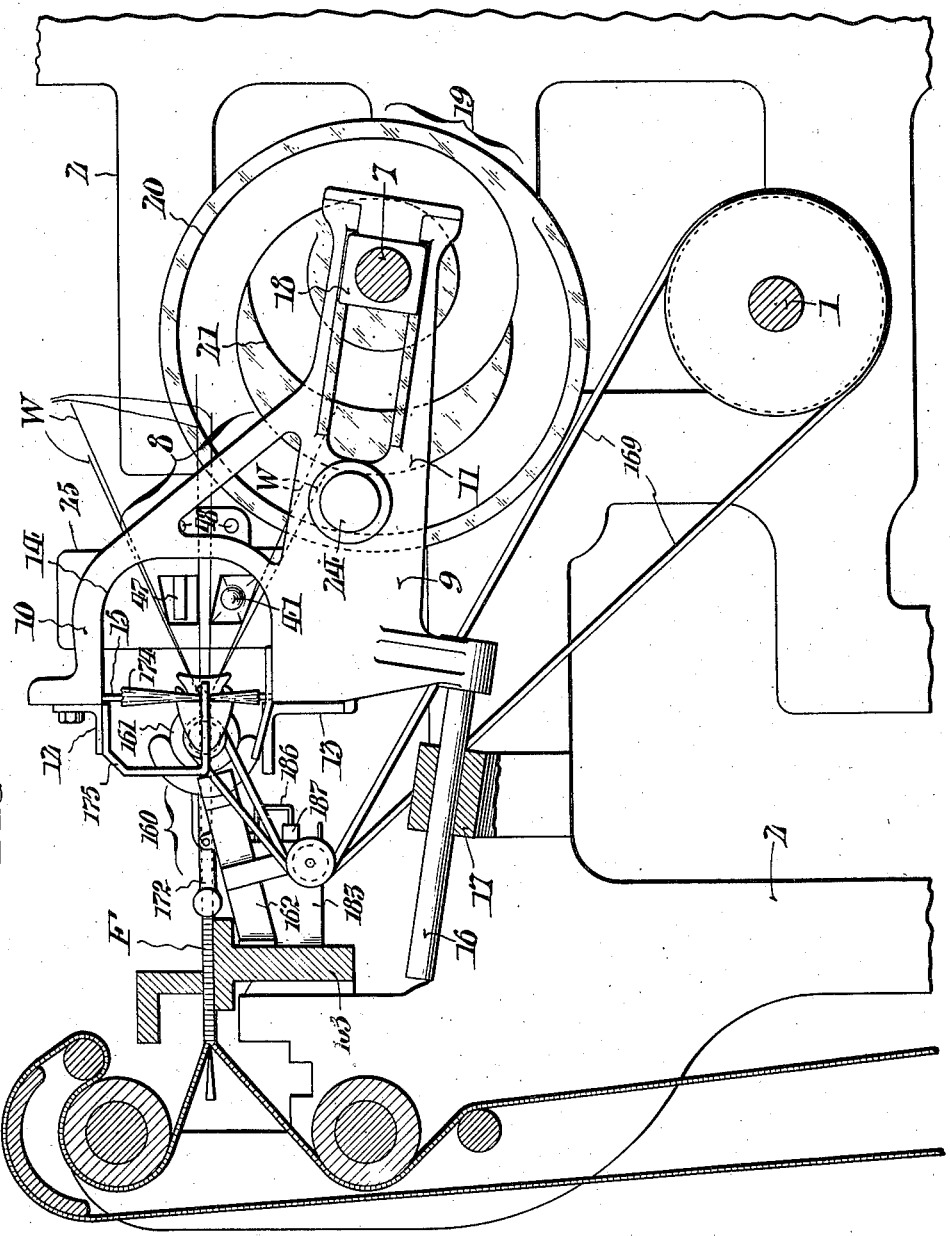

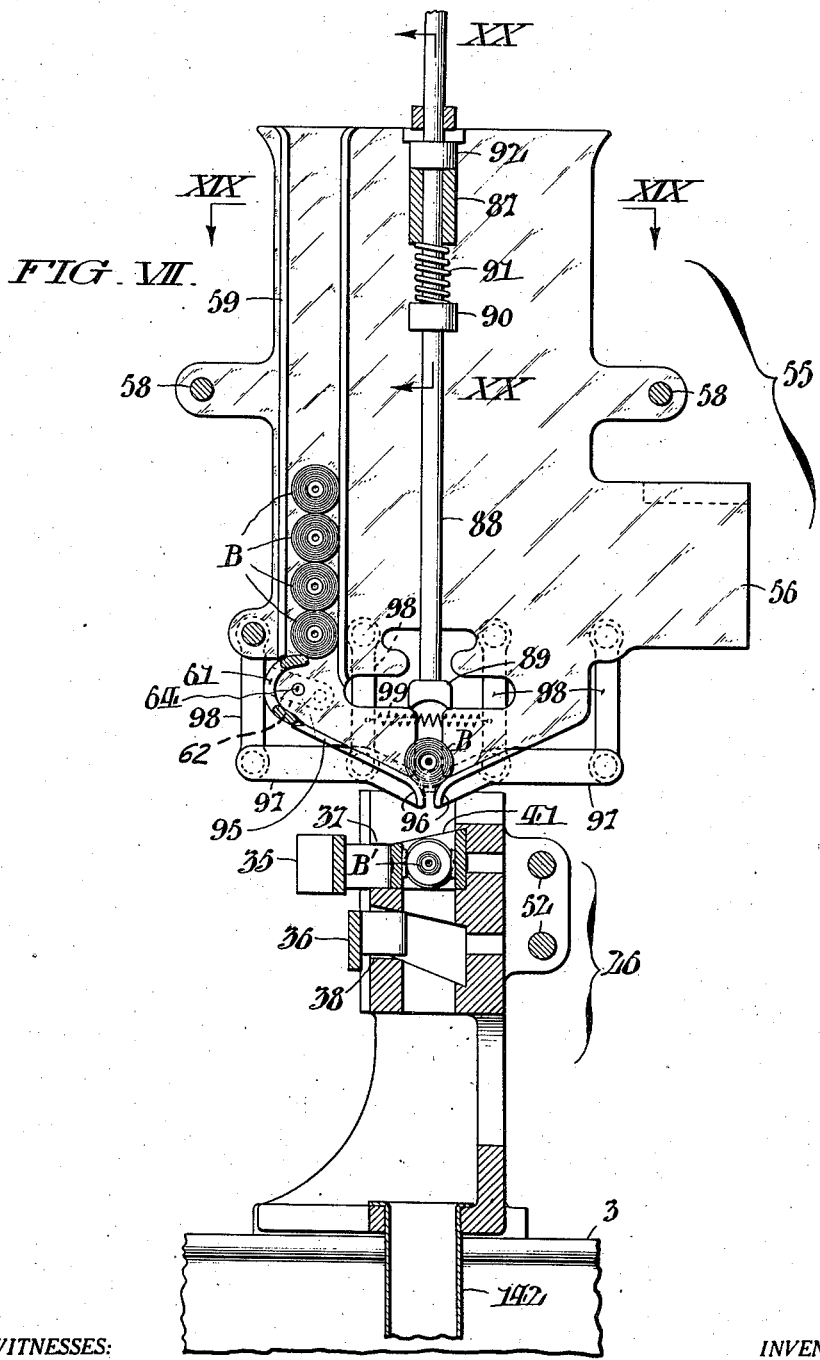

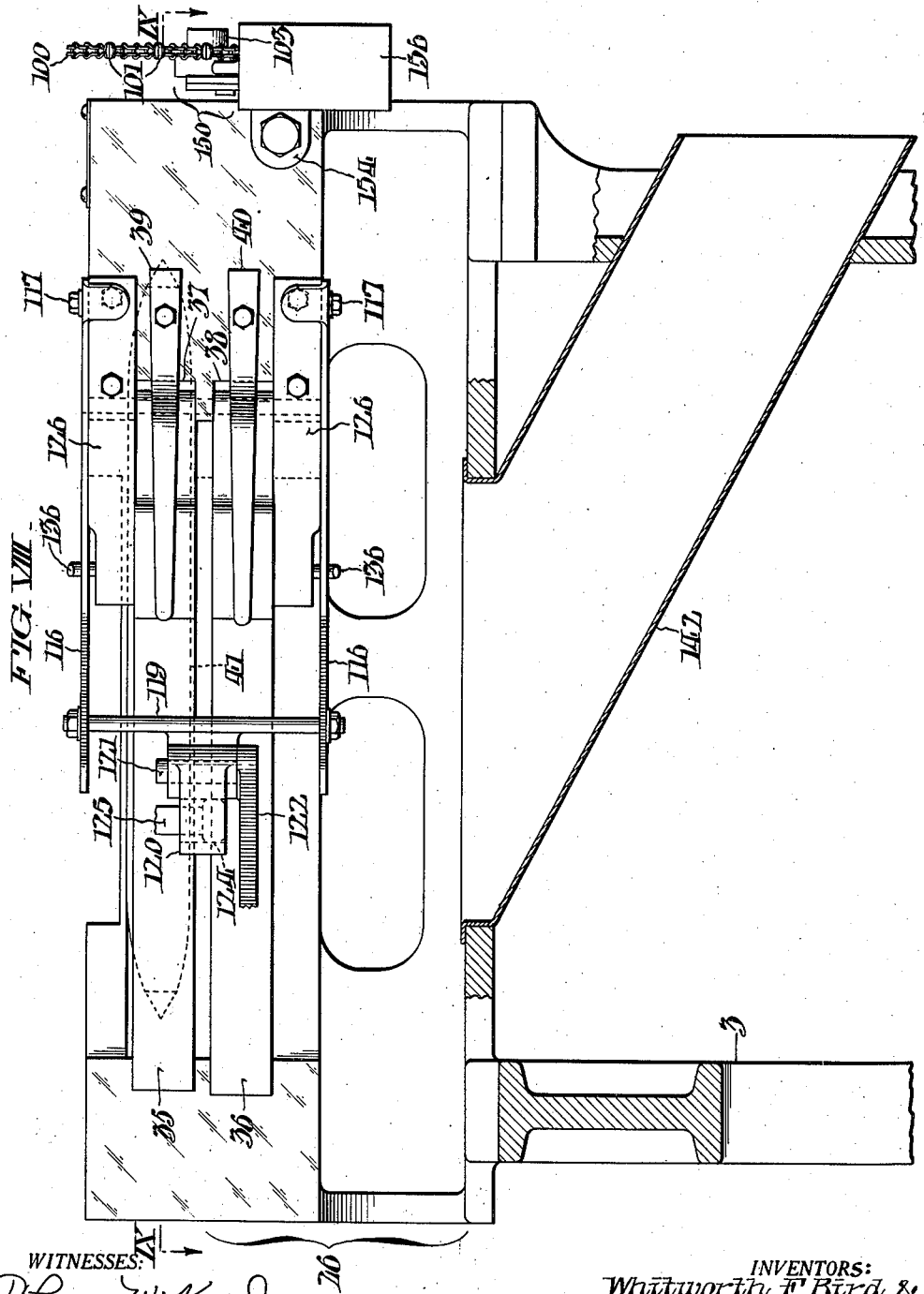

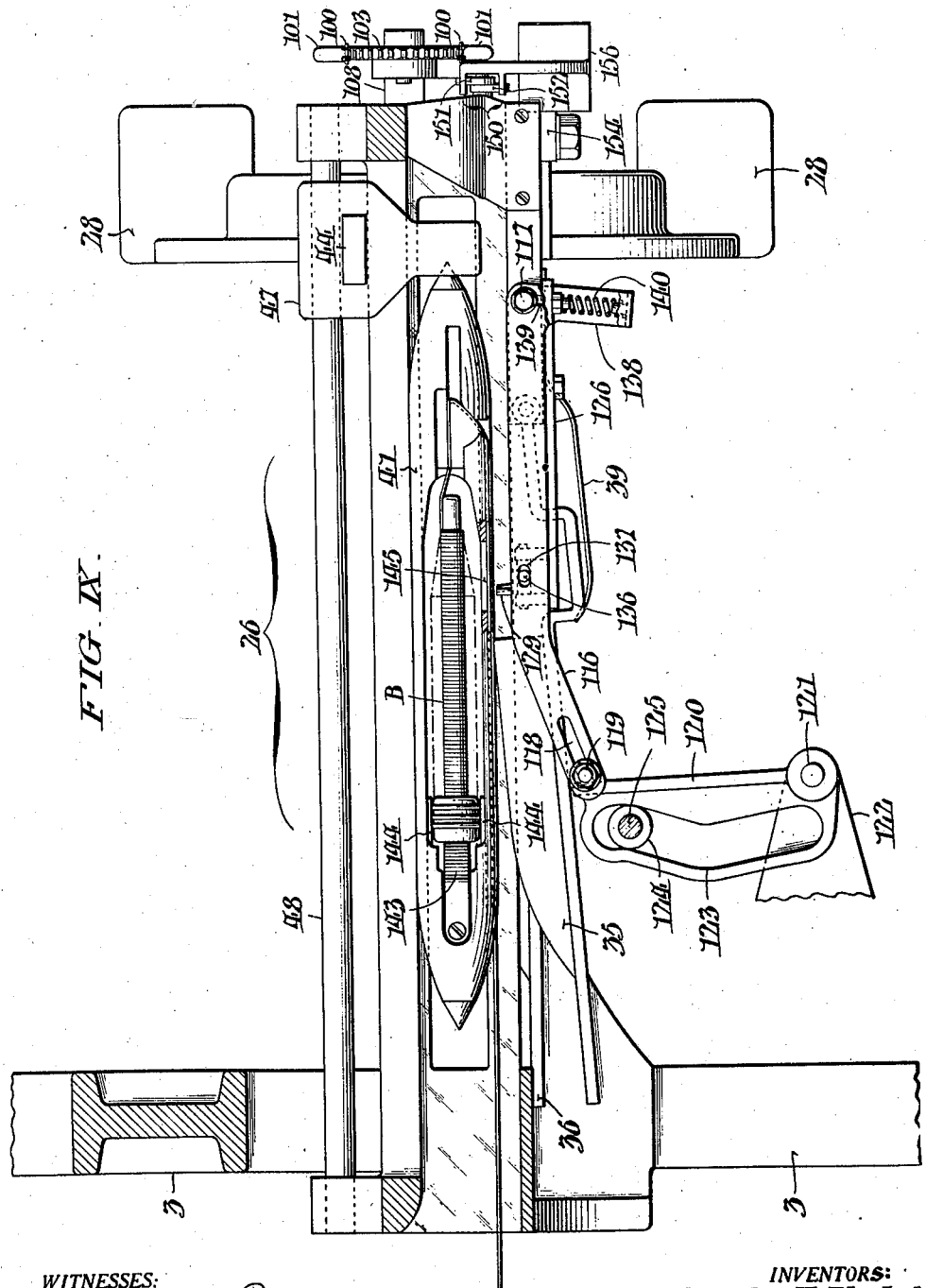

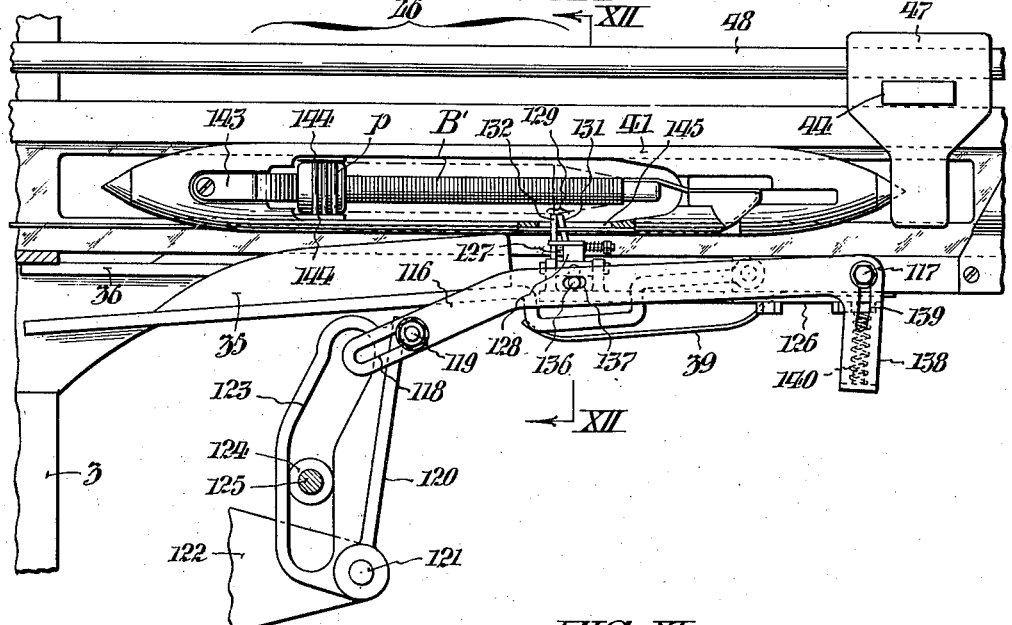

March 15, 1938. W. F. BIRD ET AL 2,111,525
LOOM
Filed Oct. 30, 1934 17 Sheets-Sheet 11
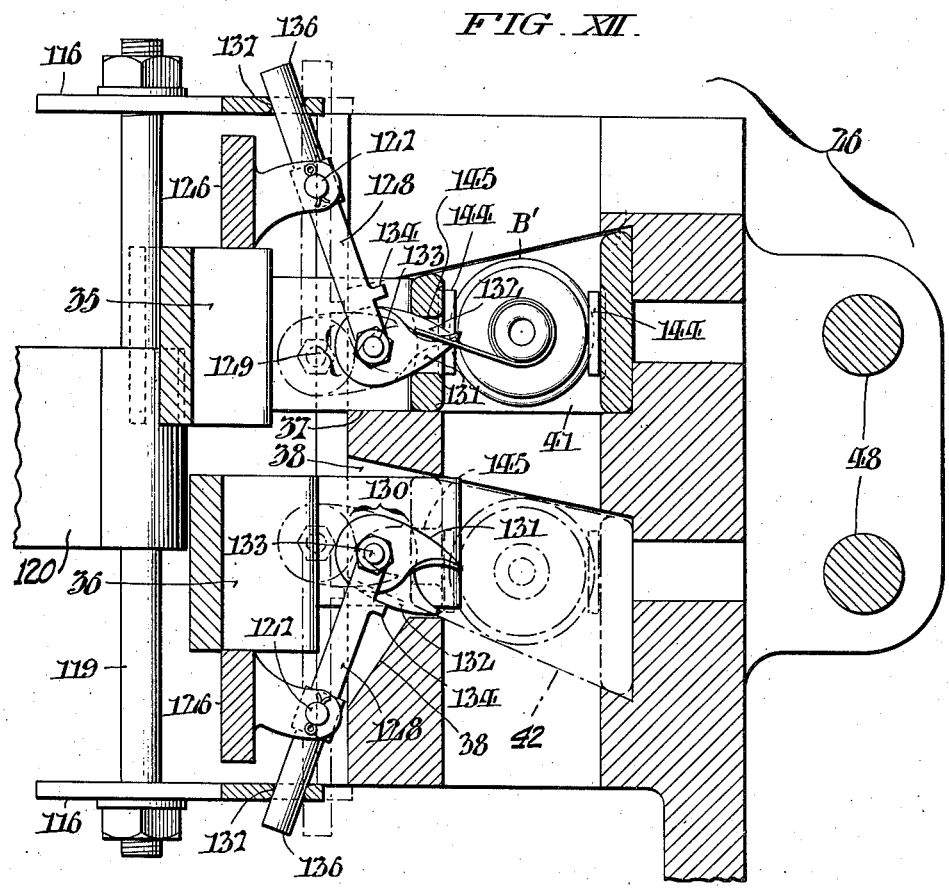
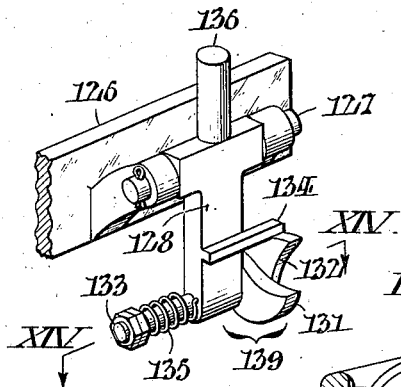
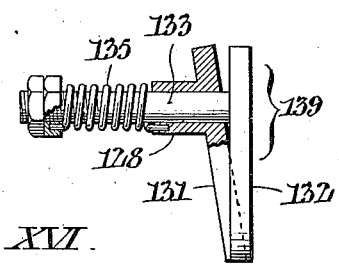
WITNESSES:
Thomas W. Kerr, Jr.
Woodrow Stevenson
INVENTORS:
Whitworth F. Bird &
William R. Hewton,
BY Fraley Paul
ATTORNEYS March 15, 1938. W. F. BIRD ET AL 2,111,525
LOOM
Filed Oct. 30, 1934 17 Sheets-Sheet 12
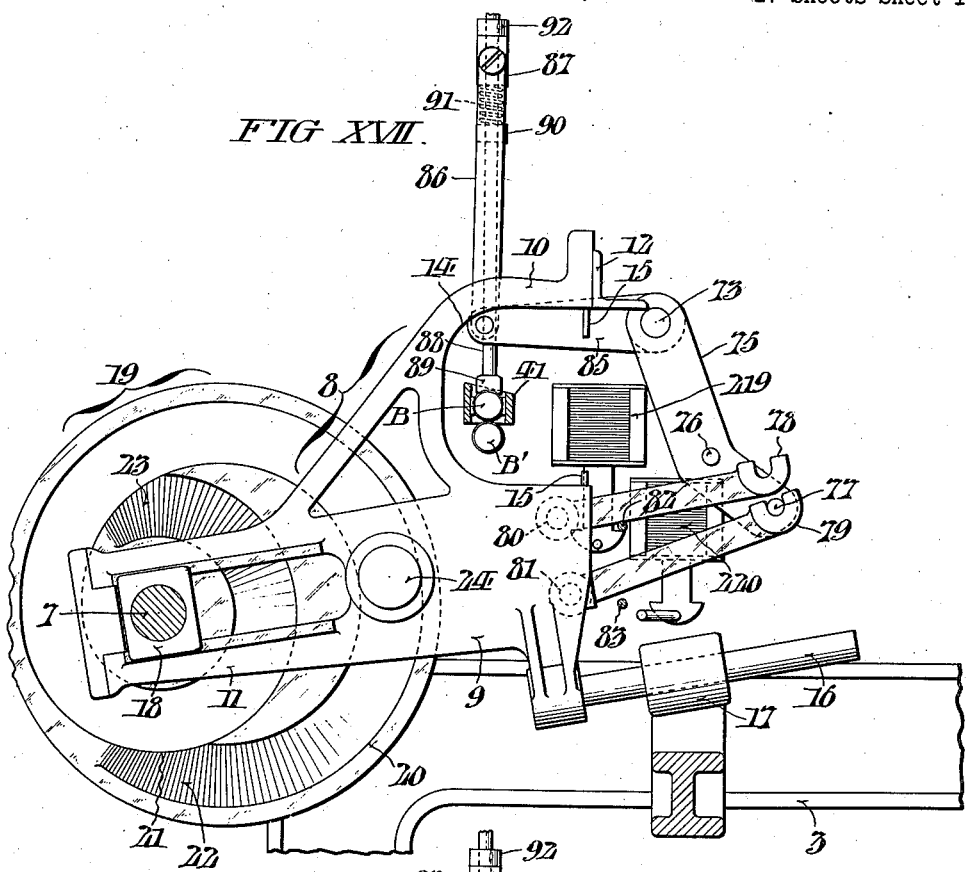
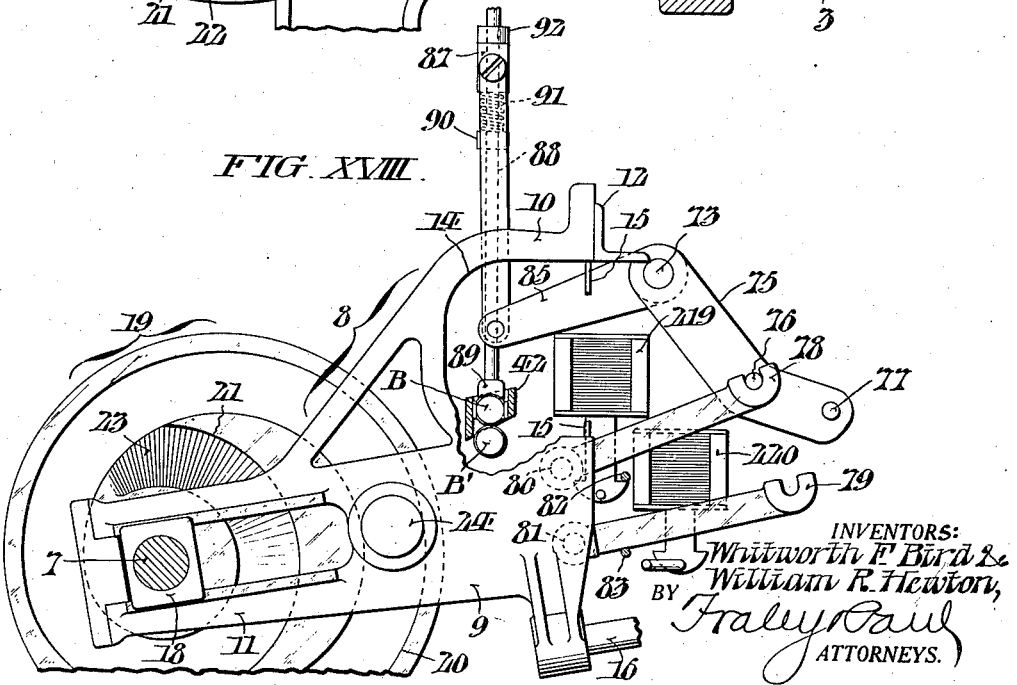
INVENTORS:
Whitworth F. Bird &
William R. Heaton,
BY Fraley Paul
ATTORNEYS.

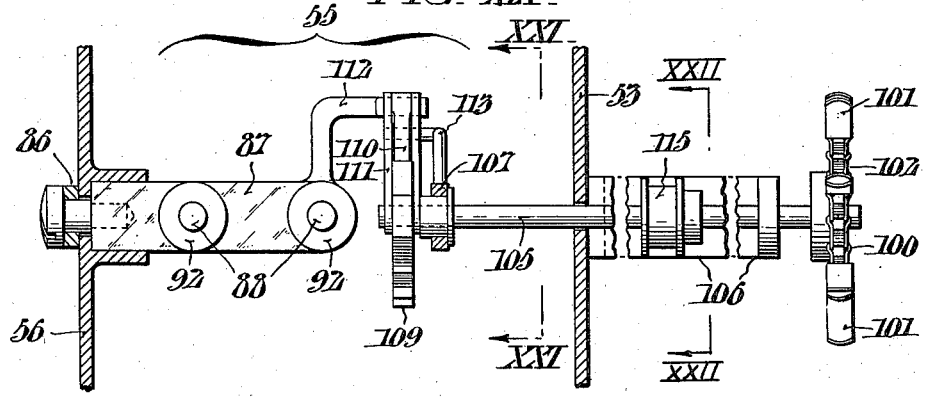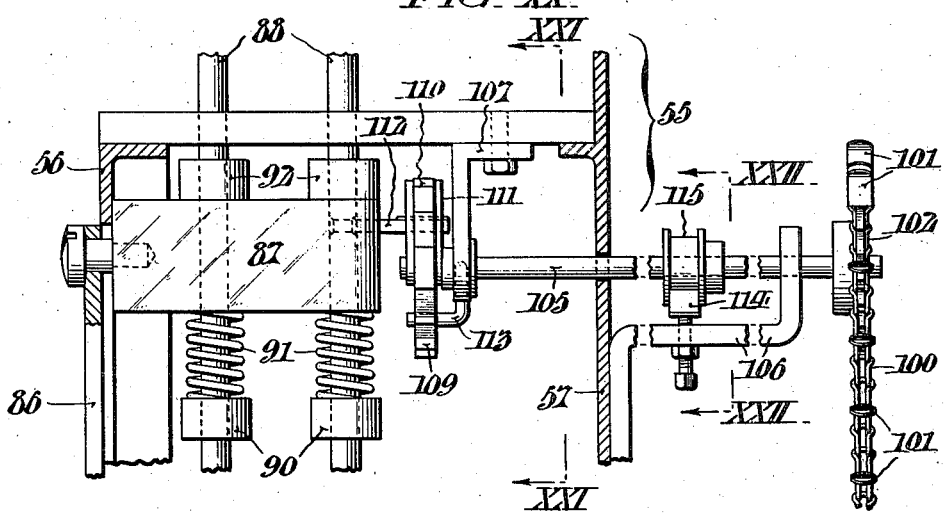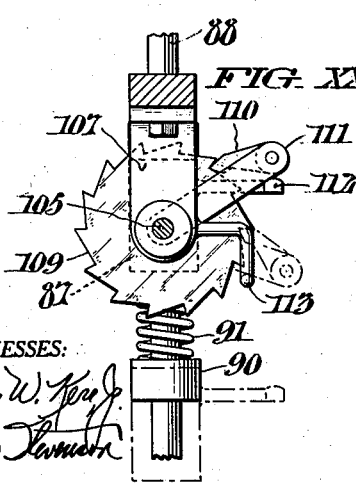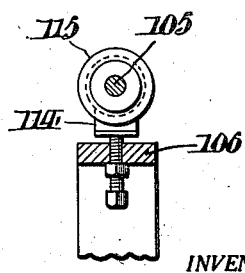

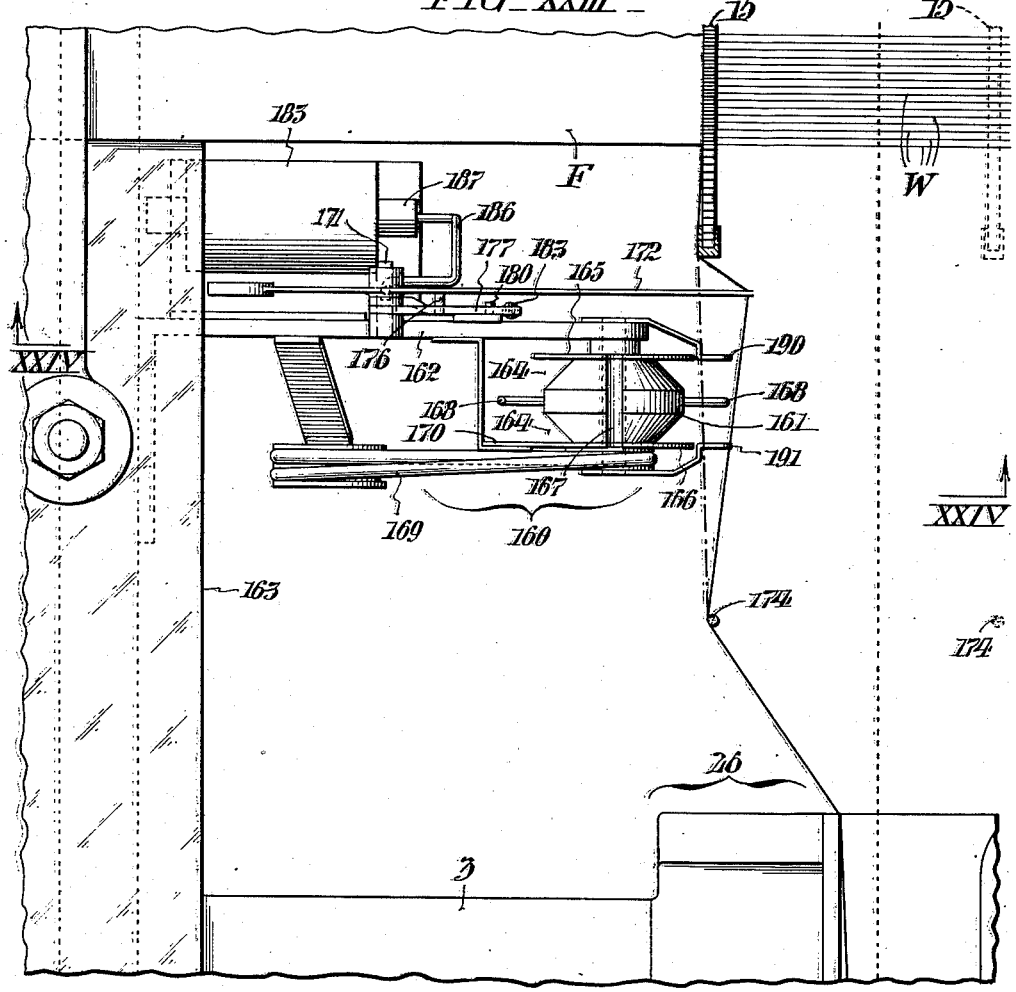
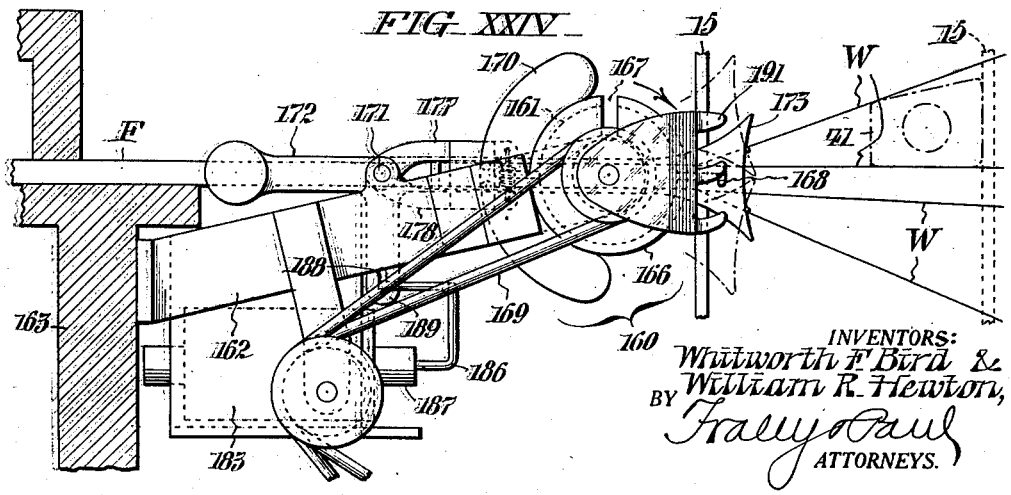

March 15, 1938.  W. F. BIRD ET AL  2,111,525
LOOM
Filed Oct. 30, 1934   17 Sheets-Sheet 15
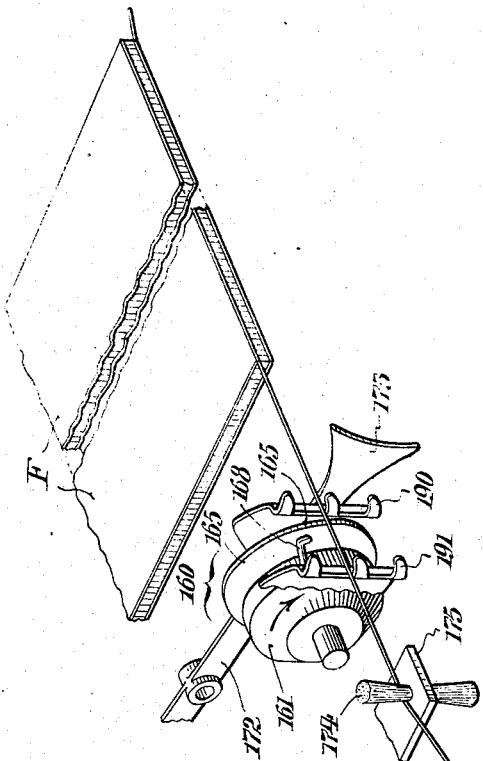
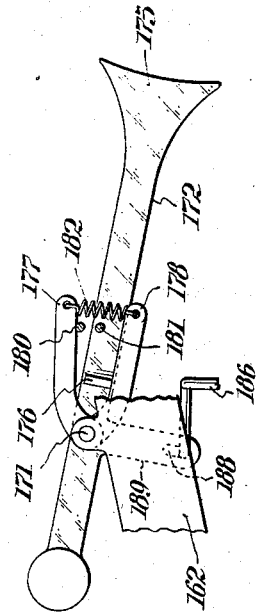
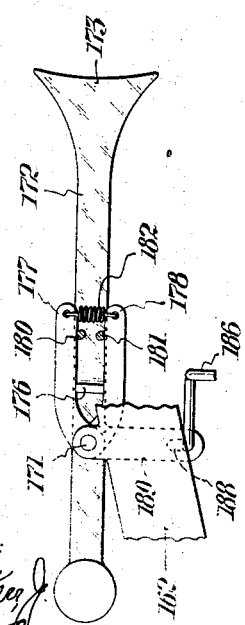
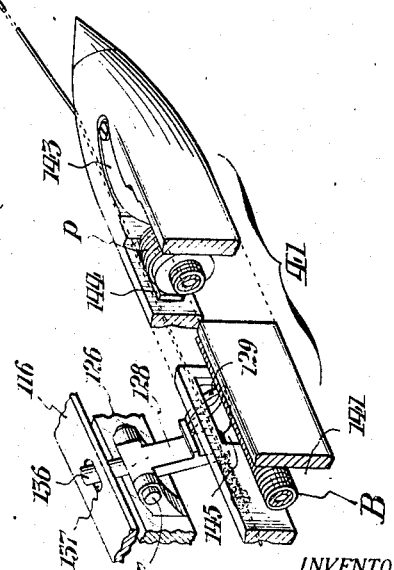
WITNESSES:
INVENTORS:
Whitworth F. Bird &
William R. Hewton,
BY
ATTORNEYS.

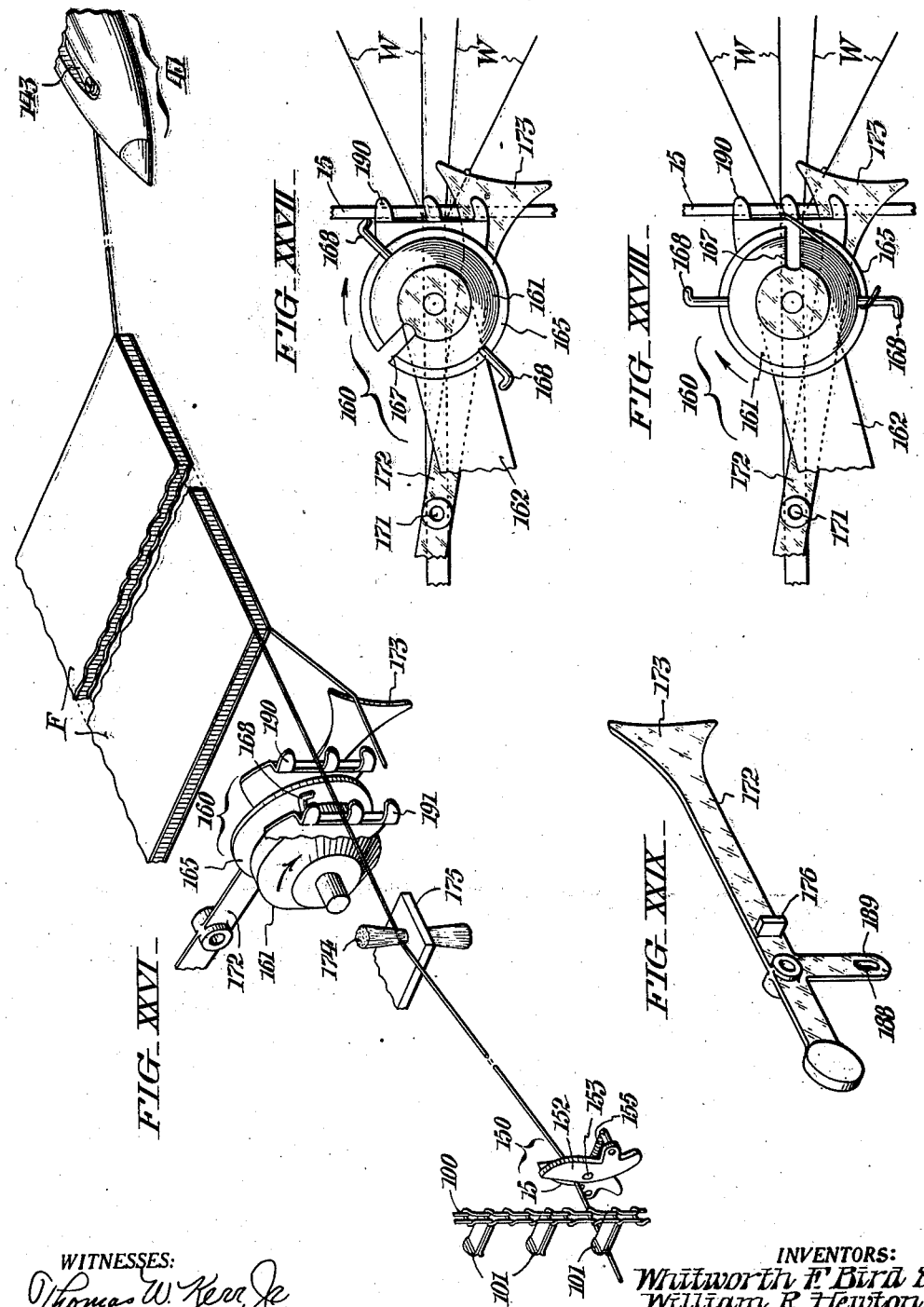

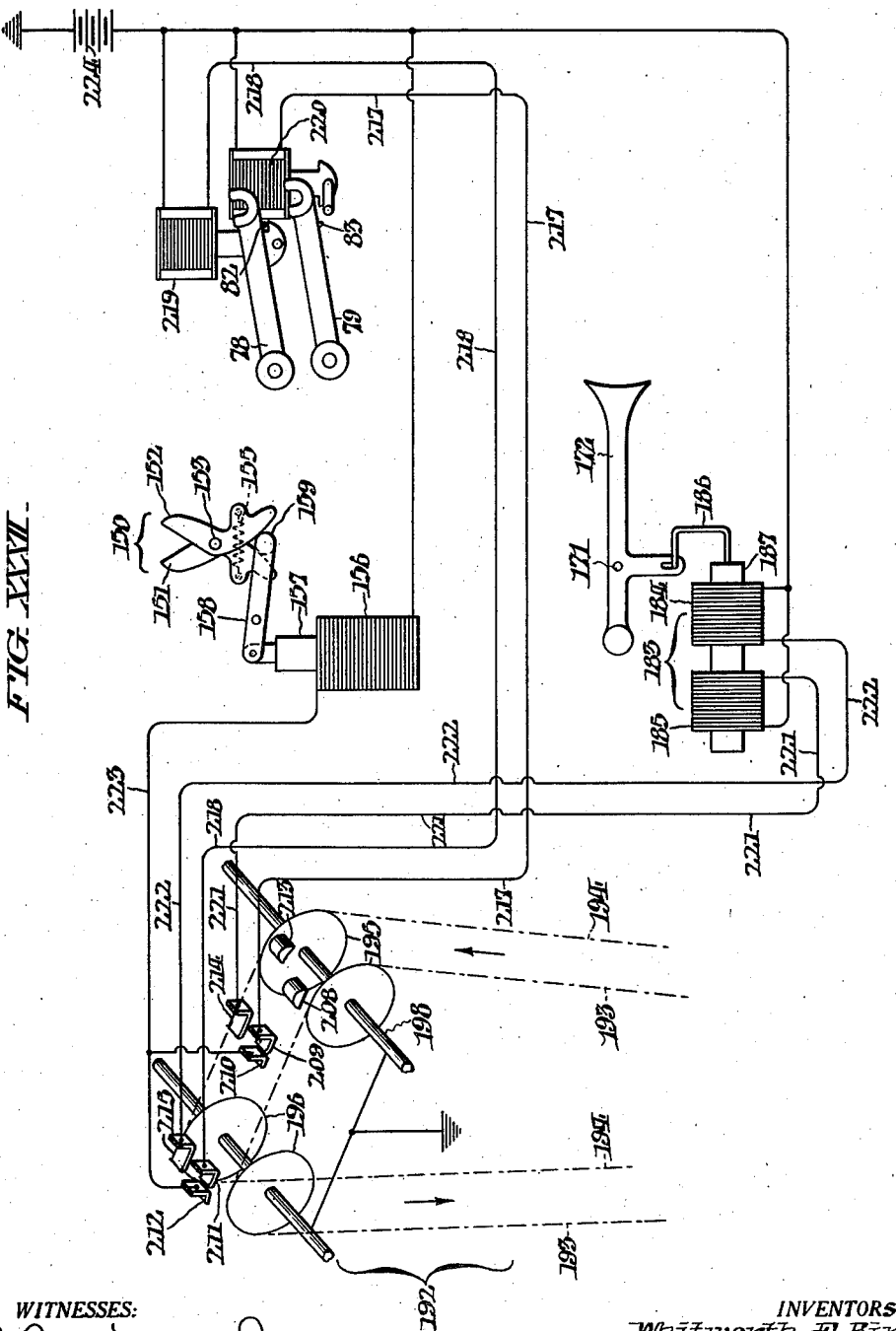

Patented Mar. 15, 1938

2,111,525

UNITED STATES PATENT OFFICE 2,111,525

LOOM

Whitworth F. Bird, Springfield, and William R. Hewton, Philadelphia, Pa., assignors to Collins & Aikman Corporation, Philadelphia, Pa., a corporation of Delaware Application October 30, 1934, Serial No. 750,626

41 Claims. (Cl. 139—243)

This invention relates to looms; and it has reference more particularly to what are known as "automatic" looms which are fitted with automatic mechanism for replenishing exhausted shuttles with new weft from a storage supply. While we have herein shown and described our invention with reference to a pile fabric loom having two shuttles for weaving double fabrics like plushes, velvets, carpets, etc., certain of its principles can be readily incorporated, with attainment of various important advantages which are fully set forth hereinafter, in single shuttle looms designed for the weaving of either double or single fabrics, as well as in looms for weaving two independent fabrics in superposed relation at one time.

Considered from the broadest aspect, our invention is directed toward securing, through refinements of construction and arrangement in automatic looms, more perfect coordination between the movements of the lay, the shuttle throwing or picking mechanism and the weft replenishing mechanism, so that the looms may be operated at much higher speeds than possible heretofore with attendant increase in fabric output from them.

An object of our invention is to provide in connection with automatic weft replenishing mechanism, ejector means capable of actuation through movement derived from the lay, in successively thrusting filled bobbins from a gravity-feed supply magazine into the shuttles, with incident displacement from the latter, of bobbins which are substantially exhausted.

Another object of our invention is to provide in weft replenishing mechanism of the kind referred to, automatic means operable incident to removal of a bobbin to follow the gravitational shift of the remaining bobbins in the magazine and to hold the weft ends of the stored bobbins separated against the possibility of entanglement.

Another object of our invention is to provide automatic means respectively for severing the weft of a substantially exhausted bobbin within a shuttle immediately before a bobbin change is to be effected, and for severing the weft end of the newly inserted bobbin at the holding means aforementioned after the first pick of the replenished shuttle.

Another object of our invention is to provide automatic means for removing, from the selvage of the fabric, the projecting ends of the old and the new wefts incident to bobbin replacements, as well as for collecting such removed ends upon severance by the severing means.

In connection with double fabric automatic looms, we aim to make possible the replacement of exhausted bobbins in the two shuttles, by filled bobbins from a single source of supply, through provision of means for throwing the shuttles simultaneously in opposite directions between stationary shuttle boxes at opposite sides of the loom, in conjunction with a selectively-operable bobbin change means capable of placing a filled bobbin in either shuttle while the shuttle rests in one of the shuttle boxes.

Another object of our invention is to provide in a double fabric automatic loom embodying all the features above mentioned, timing means for governing the selective operation of the filling replenishing mechanism, the functioning of the weft severing devices, and the means for removing the projecting ends of the wefts from the selvage of the fabric concurrently with their severance.

Further objects and attendant advantages of our invention will be manifest from the detailed description following of the attached drawings, wherein Fig. I is a view showing in side elevation, a portion of a loom conveniently embodying the present improvements.

Fig. II is an elevation of the other side of the loom.

Fig. III is a transverse sectional view of the loom taken as indicated by the arrows III—III in Figs. I and II.

Fig. IV is a fragmentary plan section taken as indicated by the arrows IV—IV in Fig. III.

Fig. V is a fragmentary longitudinal sectional view taken as indicated by the arrows V—V in Figs. III and IV.

Fig. VI is a fragmentary longitudinal section taken as indicated by the arrows VI—VI in Figs. III and IV.

Fig. VII is a fragmentary vertical view through the bobbin storage magazine taken as indicated by the arrows VII—VII in Figs. III and IV.

Fig. VIII is a fragmentary transverse sectional view taken as indicated by the arrows VIII—VIII in Fig. II, and showing the shuttle box at the right hand side of the loom.

Fig. IX is a fragmentary plan section taken as indicated by the arrows IX—IX in Fig. VIII.

Figs. X and XI are views corresponding to Fig. IX with the parts differently positioned.

Fig. XII is a detail cross sectional view of the right hand shuttle box, taken as indicated by the arrows XII—XII in Fig. X.

Fig. XIII is a perspective view of one of the devices for severing the yarn of a substantially exhausted bobbin preparatory to substitution of a new bobbin in the shuttle.

Fig. XIV is a detail sectional view taken as indicated by the arrows XIV—XIV in Fig. XIII.

Fig. XV is a perspective view of one of the shuttles.

Fig. XVI is a cross sectional view of the shuttle illustrated in Fig. XV, taken as indicated by the arrows XVI—XVI in the latter figure.

Fig. XVII is a fragmentary longitudinal sectional view of the loom corresponding to Fig. V, showing the means actuated through movement derived from the lay, for effecting bobbin substitutions in the shuttles.

Fig. XVIII is a view corresponding to Fig. XVII showing the parts differently positioned.

Fig. XIX is a fragmentary plan sectional view of the bobbin storage magazine taken as indicated by the arrows XIX—XIX in Figs. II, III, V and VII.

Fig. XX is a fragmentary vertical sectional view of the magazine taken as indicated by the arrows XX—XX in Figs. II, IV, V and VII.

Figs. XXI and XXII are fragmentary detail sectional views taken as indicated respectively by the arrows XI—XI and XXII—XXII in Figs. XIX and XX.

Fig. XXIII is a fragmentary plan view corresponding to Fig. IV on a larger scale, taken as indicated by the arrows XXIII—XXIII in Fig. III corresponding to Fig. IV and showing more particularly the means for collecting the severed portions of the wefts removed at the selvage of the fabric incident to bobbin changes.

Fig. XXIV is a detail sectional view taken as indicated by the arrows XXIV—XXIV in Fig. XXIII.

Fig. XXV is a perspective view showing how the weft end of a substantially-exhausted bobbin is severed in the shuttle preparatory to substitution of a new filled bobbin, in readiness to be removed at the fabric selvage.

Fig. XXVI is a view similar to Fig. XXV showing how the weft in a newly replenished shuttle is severed at the yarn holding means associated with the weft replenishing mechanism in readiness for its removal at the fabric selvage.

Figs. XXVII and XXVIII are detail views showing the operation of the means for removing and collecting the severed weft ends.

Fig. XXIX is a perspective view of a thread guard associated with the removing and collecting means.

Figs. XXX and XXXI are fragmentary detail views showing the guard in different positions; and Fig. XXXII is a diagram showing the timing mechanism by which the performance of various mechanisms of the loom is governed and controlled.

Referring first more particularly to Figs. I, II, III, VI, XVI and XVII of these illustrations, 1 designates the main shaft of the loom which may be driven by power in any suitable manner, and which is journaled at its ends in bearings afforded by the laterally-spaced side frames 2 and 3 of the loom. Through a train of spur gears 4, 5 and 6, rotary motion is transmitted, from the main shaft 1 to a shaft 7 at a higher level, corresponding to the usual crank shaft for actuating the lay, which latter is comprehensively designated by the numeral 8. As shown, the lay 8 comprises side members 9 which have bow-like forward portions 10 and longitudinally-slotted declining rearward extensions 11, said members being connected at the front by parallel crosswise angle bars 12, 13 immediately above and below the bow openings or recesses 14, and supporting the reed 15 between them. From Figs. VI, XVII and XVIII, it will be observed that the lay 8 is restricted to reciprocation in a plane slightly inclined to the horizontal, through engagement of forwardly-projecting upwardly-sloping rods 16 in its side members 9 with fixed guides 1" on the side frames 2, 3 of the loom and through engagement of swivel blocks 18 on the shaft 7 with the longitudinal slots in the rearward extensions 11 of said side-members whereof the angle of declination corresponds exactly with the slope of the rods 16. Instead of being formed with the usual crank or cranks, the shaft 7 is provided with similar pairs of rotary cam disks 19, the disks of such pairs being spaced to respectively receive the rearward extensions 11 of the lay side members 9 between them as shown in Figs. III and IV. The disks of each pair 19 are exact counterparts of each other, and are formed at their inner faces with mergent grooves 20, 21 which are eccentric and concentric to the axis of the shaft 7 and which have their bottoms complementarily sloped as indicated by the line shading at 22, 23 in Figs. XVII and XVIII. Axially slidable in transverse bosses of the lay side members 9 are rollers 24 whereof the ends engage the grooves of the cam disks 19. Accordingly, as the shaft 7 is revolved, the rollers 24 alternately follow the eccentric and concentric grooves 20, 21 of the cam disks 19, with the result that, during alternate rotations, the lay 8 is moved through a beat stroke, and during intervening rotations, caused to dwell in retracted position. Per se, the described lay motion forms no part of the present invention, it being the subject of a separate patent application, Serial No. 722,438, filed by the present applicants on April 26, 1934.

The shuttle boxes comprehensively designated 25, 26 (Figs. III and IV) are of the double type with upper and lower shuttle receptacles or compartments respectively at the levels of reversing upper and lower sheds formed by two sets of warp yarns W under control of suitable reversing harness (not shown) incident to the production of double pile fabric F in the well known way. In accordance with our invention, the shuttle boxes 25, 26 are stationary and rigidly secured to the side frames 2 and 3 of the loom. At their outer ends, the shuttle boxes 25 and 26 are afforded additional support by supplemental standards 27 and 28, as shown in Fig. III. The box 25 is provided with shuttle checks 29, 30, which are pivotally attached at one end and yieldingly urged inward through openings 31, 32 in the frontal side of said box, by spring fingers 33, 34. The shuttle box 26 is similarly provided with shuttle checks 35, 36, which are pivotally attached at one end and yieldingly urged inward through openings 37, 38 in the box front by spring fingers 39, 40.

The two shuttles 41, 42 which are used in the loom are simultaneously thrown in opposite directions through the upper and lower warp sheds and between the two shuttle boxes 25 and 26 by means of a picker mechanism which includes a pair of picker sticks 43 and 44, see Figs. I, II and III. As shown, these picker sticks 43 and 44 are fulcrumed at their lower ends to positionally fixed brackets 45 and 46 and have their upper ends respectively engaging pickers 47 which are slidable on horizontal guide rods 48 at the backs of the shuttle boxes, and which have forward projections reaching through longitudinal slots in the backs of said shuttle compartments into the path of the shuttles. The picker sticks 43 and 44 are actuated, as ordinarily, through strap connections 49 with levers 50 on rock shafts 51 suitably journaled in bearings at the inner sides of the frames 2, 3, near the bottom, said shafts having "bat wing" cams 52 adapted to be engaged by the "picker balls" 53 on the main shaft 1.

Surmounting the shuttle box 26 at the right hand side of the loom (Fig. III) is a gravity feed magazine 55 for filled bobbins B which are to be successively inserted into the shuttles, as later on explained, to take the place of exhausted bobbins. As shown, the magazine 55 comprises spaced side frames 56 and 57 which are rigidly connected at suitable intervals by transverse tie bars 58, said side frames affording vertical channels or guideways 59 and 60 adapted to receive the opposite ends of the bobbins B, with the latter piled on top of each other, see Fig. VII, the lowermost bobbin being intercepted by a release member 61 having a semi-annular cross section. At its ends, this release member 61 is provided with arms 62 and 63 which are pivoted at 64 to the side frames 56 and 57 of the magazine 55, the arm 62 being coupled at 65 with a vertical bar 66 which is guided in slide bearings 67 on the magazine frame 56, see Fig. V. Intermediate its ends, the slide bar 66 has a cross groove which is engaged by a finger 68 on a horizontal shaft 69 journaled in bearings on the magazine frame 56. At one end the shaft 69 has an arm 70 which is coupled by means of a drop link 71, with an arm 72 on a shaft 73 secured in fixed bearings at the front of the loom, and subject to a torsion spring 74 (Fig. IV) which tends to turn it clockwise in Fig. V. The turning movement of the shaft 73 in one direction is limited by engagement of a projection 73a on a loosely attached collar 73b with one of the tie bars 58 of the magazine 55, see Fig. III, and in the other direction by engagement of the arm 85 with a projection 56a on the side frame 56 of the magazine 55. Also secured to the shaft 73 is a pendant arm 75 of angular configuration with spaced lateral studs 76 and 77 at its lower end. These studs 76 and 77 are adapted to be engaged respectively by coupling levers 78 and 79 pivoted at 80 and 81 to one of the side members 9 of the lay 8, said levers having hook notches at their outer ends to fit the studs. Normally, the levers 78, 79 rest by gravity on stop pins 82 and 83 projecting from a bracket 84 on the loom frame 3, as shown in Fig. V. Still another arm 85 on the shaft 73 is coordinated, through an upward link 86, with a cross head 87 within the bobbin magazine 55, said cross head 87 having spaced vertical apertures for passage of plunger rods 88, which at their lower ends, are connected by an ejector plunger 89 whereof the bottom surface is concaved to correspond with the cross sectional curvature of the bobbins B. Respectively interposed between collars 90 on the thrust rods 88 and the lower face of the cross head 87, are compression springs 91 which permit the rods to yield somewhat incident to ejection of a bobbin from the magazine as later on explained. Other collars 92 on the thrust rods 88 normally engage the top of the cross head 87 to limit the downward movement of said rods under the action of the springs 91. When the stop member 61 is actuated, the lowermost bobbin B in the magazine 55 is released, and rolls down inclined continuations 95 of the guideways 59 and 60, coming to rest immediately below the ejector plunger 89 on the rods 88, with their ends supported in crotches between the downwardly curved opposing lips 96 of horizontal detaining members 97 of which there is a pair at each side of the magazine, see Figs. I, II, IV and V. As shown, the detaining members 97 are suspended by parallel suspension links 98, and each pair is connected by a tension spring 99. With this arrangement, as the plunger rods 88 are depressed to eject a released bobbin B from the magazine 55, the detaining members 97 yield to separation under spring action for passage of the bobbin ends between them.

For the purpose of supporting the free weft ends of the stored bobbins B, there is provided an endless vertical sprocket chain 100 (Figs. II, III, XIX and XX) with spaced spring pinch clips 101 to receive said yarn ends and to hold them vertically spaced against the possibility of entanglement as shown in Fig. III. This chain 100 is trained over sprocket wheels 102, 103 whereof the upper one is secured to a horizontal shaft 105 journaled in suitable bracket bearings 106 and 107 on the magazine framework, while the lower one has its shaft journaled in a bracket 108 attached to the shuttle box 26. Secured to the inner end of the upper sprocket shaft 105 is a ratchet wheel 109 which is adapted to be picked by a pawl 110 on an arm 111 free on said shaft. This arm 111 is actuated by a projection 112 on the cross head 87, and its movement downward is limited by a stop 113 on the bearing bracket 107 for the sprocket shaft 105, as shown in dot-and-dash lines in Fig. XXI. Thus, with ejection of each released bobbin B from the magazine 55, the sprocket shaft 105 is given a rotative shift, whereby the weft ends E are moved downward compensatively with the gravitation of the bobbin pile in said magazine. A brake block 114 adjustable in the bracket 106 and bearing on a flanged brake drum 115 on the sprocket shaft 105, serves to prevent overthrow of the shaft under the action of the pawl 110 and ratchet 109.

In order to sever the strands of the weft yarn projecting from the selvage of the fabric at the magazine side of the loom when a bobbin change is to be effected, we have provided in association with the right-hand shuttle box 26, a shearing means, for the explanation of which reference will be had to Figs. IV, IX–XII, and XXV. As illustrated, this shearing mechanism comprises a pair of parallel horizontal arms 116 which are pivoted to swing on fulcrum bolts 117 screwed into the top and bottom faces of the shuttle box 26. The swinging ends of the arms 116 are angularly deflected outward away from the shuttle box 26, and longitudinally slotted, as at 118, for passage of a vertical spanner bolt 119 which is secured, at the center, to a lever 120 with fulcrum support at 121 on a bracket 122 attached to the side frame 3 of the loom. The lever 120 is formed, as shown in Figs. IX–XI, with an angular cam slot 123 which is engaged by a roller 124 at the lower end of another arm 125 fast on the rock shaft 73 hereinbefore referred to, see Figs. II–V. Bolted to the front side of the shuttle box 26 along the upper and lower edges thereof are bars 126, which, at their free ends, afford medial pivot bearings 127 for arms 128 carrying shear devices 129 and 130, one to operate in conjunction with the upper shuttle 41 and the other with the lower shuttle 42. The blades of the shear devices 129 and 130 are of parrot-beak configuration, those marked 131 being rigidly secured to the supporting shank members 128, and those designated 132 being secured to pivot pins 133 slidably engaged in said shank members. The pivoted blades 131 are normally held in open position against stops 134 on the shank members 128 under the influence of helical torsion and compression springs 135 which surround the pivot pins 133, see Figs. XIII and XIV and which also maintain said blades yieldingly in shearing contact with the blades 131. The blade-supporting members 128 are provided with cylindric extensions 136 which engage medial slots 137 in the arms 116. As shown in Fig. XII, the shears 129 and 130 enter the openings 37 and 38 in the side of the shuttle box 26 to perform their cutting operations in a manner later on explained. Referring again to Figs. IX–XI, the horizontal arms 116 have lateral projections 138 at their fulcrum ends, which projections are slotted as at 139 for passage of the fulcrum bolts 117, the slots 139 being curved concentrically with respect to the centers of the medial slots 137 of said arms. Springs 140 in compression between the front faces of the bars 126 on the shuttle box 26 and downwardly and upwardly directed ends of the projections 138 of the arms 116, serve to normally hold the fulcrum ends of said arms yieldingly in the position illustrated in Figs. IX and X.

The shuttles 41 and 42, whereof one is illustrated in perspective in Fig. XV, are centrally open vertically as at 141 to permit insertion of the fresh filled bobbins B from the top and the discharge of the exhausted bobbins from the bottom, the empty bobbins dropping into a gravity chute 142 leading laterally from the loom, see Figs. II, III and VIII. Incident to their introduction, the bobbins B are guided to position in the shuttles 41 and 42 by coaction of their cylindric base portions P with cam ended plates 143 at the corresponding ends of said shuttles, the base portions of the bobbins being finally caught and frictionally held between a pair of clamp plates 144 and thereby releasably retained in the shuttles. At one side, the shuttles 41 and 42 respectively have openings 145 for registry with the side openings 37 and 38 in the shuttle box 26 to permit entry of the shear devices 129 and 130. As ordinarily, the weft yarns are drawn endwise from the bobbins B and lead out through guide eyes 146 to lengthwise clearance grooves or recessions 147 in the apertured sides of the shuttles as shown in Figs. IX–XI.

For the purpose of severing the weft of a newly placed bobbin after the first pick of the replenished shuttle, we have provided a severing means 150, which, see Figs. II–IV, VIII, IX, XXVI and XXXII, is located at the outer end of the shuttle box 26 immediately adjacent the clip chain 100. This severing device 150 comprises a pair of normally open shear blades 151 and 152 which are pivoted on a stud 153 and supported in the path of the clips 101 on the sprocket chain 100 by a fixed bracket 154, and connected by a spring 155. Accordingly, upon ejection of a fresh bobbin B from the magazine 55 and concurrent shifting of the chain 100, the weft of such bobbin is moved into position for cutting between the open shear blades 151 and 152. The operation of the shear blades 151 and 152 is effected by means of a solenoid 156 whereof the armature 157 is coordinated with a pivoted finger 158 having a lateral projection 159 at its free end engaging between pendant tails of said shear blades.

For the purpose of removing from the selvage of the fabric the projecting portions of the wefts after severance by the shears 129 and 130 from exhausted bobbins in the shuttles, as well as those severed by the shears 150, we have provided mechanism 160 for the explanation of which reference will be had more particularly to Figs. I, III, IV, XXIII, XXIV and XXV–XXXII. This mechanism 160 comprises a collecting spool 161 which is journaled for rotation in a bracket 162 secured to a cross member or girt 163 joining the side frames 2, 3 near the front of the loom. The spool 161 is tapered at opposite ends with resultant formation of a flat center portion and angular thread receiving spaces 164 inward of circular end flanges 165 and 166. The spool 161 is moreover formed with a transverse slot 167, and with a pair of hooked yarn grasping fingers 168, which project radially from its flat center portion. By means of a belt connection 169 with the main shaft 1 of the loom, the spool 161 is constantly driven at high speed in the direction of the arrows. An arcuate guard wing 170 supported by the bracket 162 in line with the head flange 166 of the spool 161 precludes entanglement of the severed weft ends with the drive belt 169. Fulcrumed on a lateral stud 171 on the spool bracket 162 is a counterweighted deflector element 172 which normally occupies the horizontal position shown in Figs. XXIV and XXX, so that the flared guard 173 at one end thereof normally prevents the wefts leading from the shuttles 41 and 42 from being brought into the range of the grasp hooks 168 on the spool 161 as the reed 15 is advanced during the beat strokes of the lay 8, at which time the wefts are also pressed forward at a point outward of the winding mechanism by the bristles of a double ended brush 174 carried by a bracket 175 on said lay in line with the reed 15. The deflector element 172 is held in its normal horizontal position through engagement of a lateral projection 176 thereon between a pair of fingers 177 and 178 (Fig. XXX) which are independently free on the fulcrum stud 171 and held against stops 180 and 181 on the spool bracket 162 by a helical tension spring 182 connecting their outer ends. A horizontal double-acting double coil solenoid 183 (Figs. IV, XXIII, XXIV, XXVII, XXVIII and XXXII) secured to the spool bracket 162 is utilized as a means for swinging the weft deflector 172 either up or down to the positions shown in dot-and-dash lines in Fig. XXIV, the required movements being imparted through engagement of a hook projection 186 on the armature 187 of said solenoid with a slot 188 in a pendant arm 189 of said deflector. When the deflector 172 is swung upward or downward, the weft strands beyond the cloth selvage are advanced by the reed 15 and the brush 174 on the lay 8, to the position shown in dot-and-dash lines in Fig. XXIII into the path of the catch hooks 168 on the spool 161, and at the same time lodged between horizontally projecting tines of a pair of spaced fork-like arresting members 190 and 191 fashioned from sheet metal and affixed to the spool bracket 162, said tines being in the planes of the head flanges 165 and 166 of the spool.

Substitution of fresh bobbins for the exhausted ones on the shuttles 41 and 42 is controlled by a timing means 192 (Figs. I and XXXII) including a pair of continuously-motivated sprocket chains 193 and 194 which are confined to a vertical triangular course adjacent the side frame 2 of the loom by two substantially horizontally spaced double sprocket wheels 195, 196 at a level above the lay actuating shaft 7 and a grooved idler pulley 197 at the lower part of said frame. The shaft 198 of the double sprocket wheel 195 is journaled in a fixed bracket 199 and carries a spur gear 200 in mesh with a similar spur gear 201 on another shaft 202 which also is journaled in said bracket. The shaft 202 is in turn driven through a worm gear couple 203 from a vertical shaft 204 journaled at its upper and lower ends in bracket bearings 205 and 206 on the side frame 2 of the loom and receiving motion, through a miter gear couple 207 from the lay-actuating shaft 7. From Figs. I and XXXII it will be observed that the chain 193 carries a lug 208, which, incident to its travel, wipes successively against stationary spring contacts 209, 210, 211 and 212; while the chain 194 carries a lug 213 somewhat behind the lug 208 in the direction of the chain movement, which successively wipes stationary spring contacts 214 and 215. As shown in Fig. XXXII, the spring contacts 209–212 are arranged as pairs which are well spaced from each other, while the spring contacts 214 and 215 are respectively in line with the contacts 209, 210 and 211, 212 transversely of the chains 193 and 194, said contacts being all supported by an insulating block 216 (Fig. I) suitably secured to the frame 2 of the loom above the substantially top horizontal runs of said chains. By means of conductors 217 and 218 (Fig. XXXII), the spring contacts 209 and 211 are electrically connected to corresponding terminals of lifting solenoids 219 and 220 which are instrumental in coupling the hook levers 78 and 79 on the lay 8 with the plunger actuating means of the bobbin magazine 55. The spring contacts 214 and 215, are respectively connected, by conductors 221, 222, to corresponding terminals of the oppositely wound coils 184 and 185 of the double acting solenoid 183 by which the weft deflector 172 is actuated. The remaining two spring contacts 210 and 212 are both connected through a conductor 223 to one terminal of the solenoid 156 by which the shearing device 150 is actuated. Electric current necessary for energization of the several electrical devices just referred to is furnished by a suitable battery 224, the return circuits being all grounded through the framework of the loom in a manner which will be readily understood from Fig. XXXII.

The operation of our improved loom is as follows: Insofar as the weaving of the double fabric F is concerned, the performance of the loom is identical with that of any conventional double fabric loom except in that the two shuttles are concurrently shot from opposite sides of the loom instead of from one side. As previously pointed out, this makes possible the replenishment of the weft from a single source of supply which is accomplished under control of the timing chains 193 and 194. The length of the timing chains 193 and 194 is made proportional to the amount of thread wound on the full bobbins B in the magazine 55, so that during a cycle of said chains, the exhausted bobbins are replaced in both shuttles. A bobbin change in the upper shuttle 41 is initiated by the lug 208 on the timing chain 193 while said shuttle 41 is temporarily resting in the shuttle box 26 with the lay 8 in its retracted position as shown in Fig. V. Through engagement of the lug 208 on the pattern chain 193 with the spring contact 209 and resultant energization of the solenoid 220, the hook lever 79 is lifted into coupling engagement with the stud 77 of the arm 75 on the rock shaft 73 as shown in Fig. XVII. During the succeeding beat stroke of the lay 8, the timing chains 193 and 194 advance to bring the lug 213 on the chain 194 into engagement with the spring contact 214, with the result that the circuit 221 through the coil 185 of the double solenoid 183 is closed and the armature 187 of said solenoid is moved to the left in Fig. XXXII to lower the weft guard 172 as shown in Figs. XXVII and XXVIII below the level of the weft yarn of the substantially exhausted bobbin in the upper shuttle 41. As the lay 8 advances, the shaft 73 is turned counterclockwise in Figs I and V (due to coupling of the hook lever 79 with the arm 75) against the action of the torsion spring 74, with attendant actuation of the cam lever 120, by the roller arm 125 and movement of the arms 116 outward of the shuttle box 26 as shown in Fig. X. The shear device 129 is thereby swung inward about its fulcrum 127 (Fig. XXII) into the side aperture 145 in the upper shuttle 41, and the shear blades closed by camming action with said aperture to sever the weft of the substantially-exhausted bobbin in said shuttle. This occurs just as the lay 8 completes its beat stroke with the weft end of the exhausted bobbin positioned, as shown in dot and dash lines in Fig. XXIII (the weft guard 172 having been lowered out of the way as above explained), within the stationary combs 190 and 191 of the spooling device 160 and disposed in the path of the catch hooks 168 on the spool 161. By rapid rotation of the spool 161, the strand of the severed weft projecting beyond the selvage of the fabric F is caught at the center by the hooks 168, torn away at the fabric selvage, and the ends thereof wrapped in the angular recess 164 of the spool while reeving through the stationary combs 190 and 191. Concurrently with the above events and by the same counterclockwise movement of the shaft 73, the plunger 89 is actuated through the arm 85 and link 86 to eject a previously-released bobbin B resting on the spring-connected holder elements 97. By the stroke of the plunger 89, the released bobbin B is thrust downward from the magazine through the vertically-open shuttle box 26 and inserted into the resting shuttle as shown in Fig. XVII, the substantially exhausted bobbin B' being at the same time dislodged and dropping into the discharge chute 142. The immediately foregoing also occurs just as the lay completes the current beat stroke. Upon completion of the succeeding retractive stroke of the lay 8 i. e. the rearward movement toward the left in Fig. 1, the newly replenished shuttle 41 is shot from the shuttle box 26 into the shuttle box 25. At the moment the lay completes its next beat stroke, the lug 208 on the timing chain 193 reaches the spring contact 210, with resultant closure of the circuit 223 and energization of the solenoid 156 (Fig. XXXII) to operate the shear device 150 whereby the newly laid weft is severed as shown in Fig. XXVI. By the last described beat stroke of the lay 8, the new weft yarn is lodged between the stationary combs 190 and 191 of the spooling device 160 (the weft guard 172 being held in its lowered position by virtue of continued engagement of the lug 213 on the timing chain with the spring contact 214), and the projecting portion extending between the shuttle 41 (now in the box 25) and the selvage of the fabric F, is caught by the catch hooks 168 of the spool, torn away at the selvage, and wrapped about said spool in the same manner as described in connection with the severed end of the exhaust bobbin previously removed from the shuttle 41. By the time the lay 8 again retracts, the lugs 208 and 213 on the timing chains 193 and 194 will have passed beyond the spring contacts 209, 210 and 214 so that the parts which were instrumental in effecting the bobbin change and the removal of the projecting portions of the old and new wefts from the selvage of the cloth are permitted to resume their normal positions under the reverse action of the spring 74 on the shaft 73. In this connection it is to be understood that the hook lever 79 drops from engagement with the stud 77 on the arm 75 when the lay reaches its fully-retracted position. Incident to rise of the plunger 89 in the magazine after ejection of the bobbin from the magazine 55, the lowermost bobbin B in the stored column is released as a consequence of the actuation of the stop means 61 from the rock shaft 73 through the arm 72 thereon and the intermediate connections, to wit, the link 71, arm 70, rock shaft 69 and slide bar 66. The bobbin so released rolls down into the crotch between the rounded ends 96 of the holder members 97 immediately upon re-elevation of the ejecting plungers to their normal positions in a manner which will be readily understood from Fig. VII.

Bobbin change in the lower shuttle 42 is also initiated by the lug 208 on the timing chain 193, which lug, by engaging the spring contact 211, causes the energization of the circuit 218 through the solenoid 219 with attendant lifting of the hook lever 78 into coupling engagement with the pin 76 on the arm 75 as shown in Fig. XVIII. All the operations incident to the bobbin change for the lower shuttle 42 are identical with those described in connection with the bobbin change for the upper shuttle 41 and occur while the lower shuttle 42 is resting in the box 26, and under control of the timing chains 193 and 194 whereof the lugs 208 and 213 successively engage the spring contacts 211, 212 and 215 respectively. It is however to be noted that, by virtue of the shorter distance of the pin 76 from the fulcrum axis 73 of the arm 75, the ejector plunger 89 of the bobbin magazine 55 is this time given a longer thrust to carry the filled replacement bobbin B into the lower shuttle 42. It is also to be understood, that in this case, the weft guard 172 is raised from its normal position upon engagement of the lug 213 on timing chain 194 with the spring contact 215, which, by way of the conductor 222 is in circuit with the coil 184 of the double acting solenoid 183, the energization of said coil causing the armature 187 to be moved toward the right in Fig. XXXII. The accumulation of the threads on the spool 161 may be easily removed from time to time after cutting them crosswise at the slot 167 of said spool during inactive periods of the loom.

Through use of the hereinbefore described cam motion for actuating the lay 8, dwell periods are afforded not only to insure ample time for passage of the shuttles 41 and 42 between the boxes 25 and 26, but also for the coupling of the hook levers 78 and 79 with the actuating arm 75 of the weft replenishing mechanism. Accordingly, the loom can be operated at very high speeds without the possibility of failure of the weft replenishing mechanism to function. In the event that either of the shuttles 41 and 42 fails to fully enter the box 26, the arms 116 can yield under the action of the springs 140 incident to actuation of the arms 120, as shown in Fig. XI, during a shuttle change cycle without injury to the shuttle or the shears 129, 130.

It is further important to note from the foregoing that, due to the use of picker mechanism arranged to throw the shuttles simultaneously in opposite directions between stationary shuttle boxes at opposite sides of the loom, we have made it possible to effect weft replenishment from a single source of supply, with attendant simplification in the construction of the loom.

Having thus described our invention, we claim:

1. In a double fabric loom, a lay; a stationary shuttle box at each side of the loom comprising a pair of shuttle compartments; a pair of shuttles; mechanism for concurrently throwing the shuttles across the lay in opposite directions between the stationary shuttle boxes; a magazine for filled bobbins; means in association with the magazine to hold the free warp ends of the stored bobbins separated; automatic means for replacing substantially exhausted bobbins in the respective shuttles with filled bobbins from the magazine at different times while said shuttles are resting temporarily in one of their respective shuttle boxes; automatic means for severing the wefts of the substantially exhausted bobbins at the shuttles as the changes are effected; automatic means for severing the weft ends of the substituted bobbins at the holding means after the first picks respectively of the replenished shuttles; and automatic means for removing the severed strands of the old and new wefts projecting from the selvage of the fabric being woven including a rapidly rotating spool with radial catch hooks, a deflector for normally holding the wefts out of the range of the catch hooks on the spool as the lay beats them into the fabric, and means for moving the deflector to allow the severed projecting weft strands aforesaid of one shuttle or the other as the case may be, to be brought into the range of the catch hooks, and to be torn away from the fabric selvage incident to being wrapped on the spool.

2. In a double fabric loom, a lay; a stationary shuttle box at each side of the loom comprising a pair of shuttle components; a pair of shuttles; mechanism for concurrently throwing the shuttles across the lay in opposite directions between the stationary shuttle boxes; a magazine for filled bobbins; means in association with the magazine to hold the free warp ends of the stored bobbins separated; automatic means for replacing substantially exhausted bobbins in the respective shuttles with filled bobbins from the magazine at different times while said shuttles are resting temporarily in one of their respective shuttle boxes; automatic means for severing the wefts of the substantially exhausted bobbins at the shuttles as the changes are effected; automatic means for severing the weft ends of the substituted bobbins at the holder means after the first picks respectively of the replenished shuttles; and automatic means for removing the severed strands of the old and new wefts projecting from the selvage of the fabric being woven, including a rapidly rotating spool with radial catch hooks, a deflector for normally holding the wefts out of the range of the catch hooks on the spool as the lay beats them into the fabric, stationary horizontal combs at opposite sides of the spools, and means for automatically moving the deflector to allow the severed projecting strands aforesaid of the old and new yarns of one or the other of the shuttles as the case may be, to be brought into the range of the catch hooks and into engagement with the horizontal combs, torn away from the fabric selvage and the ends of the strands collected on the spool at opposite sides of the catch hooks while reeving through the stationary combs.

3. In a loom, a lay; a stationary shuttle box at each side of the loom; a shuttle; means for throwing the shuttle across the lay alternately in opposite directions between the shuttle boxes during the weaving; a magazine for filled weft bobbins; means adjacent the magazine to hold the weft ends of the stored bobbins separated; automatic mechanism including means arranged upon exhaustion of a bobbin in the shuttle, to replace it by a filled one from the magazine while the shuttle is resting in one of the boxes; means arranged after the first pick of the replenished shuttle and upon beating up by the lay of the weft from the new bobbin therein, to sever said weft at the holding means; and actuating means for said severing means.

4. A loom in accordance with claim 3, including automatic means to remove the projecting portion of the severed weft from the selvage of the cloth being woven.

5. In a loom, a lay; a stationary shuttle box at each side of the loom; a shuttle; means for throwing the shuttle across the loom alternately in opposite directions between the shuttle boxes; a magazine for filled bobbins; means associated with the magazine to hold the ends of the yarns of the stored bobbins separated against entanglement; automatic mechanism arranged upon substantial exhaustion of a bobbin in the shuttle, to replace it by a filled one from the magazine while said shuttle is resting in one of the boxes; means for severing the weft of the substantially exhausted bobbin at the shuttle immediately before bobbin interchange is effected; means arranged after the first pick of the replenished shuttle and beating up by the lay of the weft from the new bobbin therein, to sever the latter weft at the holding means and actuating means for said severing means.

6. A loom in accordance with claim 5, including automatic means for removing the projecting portions of both the old and new wefts from the selvage of the cloth being woven.

7. A loom in accordance with claim 5, including automatic means for removing the projecting portions of both the old and new wefts from the selvage of the cloth being woven, and for collecting the removed weft strands.

8. A loom in accordance with claim 5, wherein the severing means for the weft of the exhausted bobbins includes an arm fulcrumed on the shuttle box, a pair of parrot-beak shear blades on a support pivoted to swing laterally of the shuttle box, said support having a shank engaging an aperture in the arm, and means for automatically actuating said arm to cause the shear blades to be thrust through an aperture in the side of the shuttle and to be closed by camming action with the walls of the aperture.

9. A loom in accordance with claim 3, wherein the severing means is in the form of a shear device with normally-open inter-pivoted blades, and means for closing the shears for the purpose aforesaid.

10. A loom in accordance with claim 3, wherein the severing means is in the form of a shear device with normally-open interpivoted blades; and including means comprising an electro-magnet for actuating the shear device; and automatic control means for effecting energization of said electromagnet.

11. In a loom, a lay; a stationary shuttle box at each side of the loom; a shuttle; means for throwing the shuttle across the loom alternately in opposite directions between the shuttle boxes, a storage magazine for filled bobbins; means associated with the magazine to hold the ends of the yarns of the stored bobbins separated; automatic mechanism including means arranged upon substantial exhaustion of a bobbin in the shuttle, to replace it by a filled one from the magazine while said shuttle is resting in one of the boxes; means for severing the weft of the substantially exhausted bobbin at the shuttle immediately before bobbin interchange is effected; means arranged after the first pick of the replenished shuttle and beating up, by the lay of the weft from the new bobbin therein, to sever the latter weft at the holding means; electromagnetic means respectively controlling the bobbin replacing means and the two severing devices; and timing means for governing the energization of the several electromagnetic means for performance of the functions aforesaid in the proper sequence.

12. In a loom, a lay; a stationary shuttle box at each side of the loom; a shuttle; means for throwing the shuttle across the lay alternately in opposite directions between the shuttle boxes; a storage magazine for filled bobbins; means associated with the magazine to hold the ends of the yarns of the stored bobbins separated; automatic mechanism arranged upon a substantial exhaustion of a bobbin in the shuttle, to replace it by a filled one from the magazine while said shuttle is resting in one of the boxes; means for severing the weft of the substantially exhausted bobbin at the shuttle immediately before bobbin interchange is effected; means operative after the first pick of the replenished shuttle and beating up of the weft from the new bobbin therein by the lay, to sever the latter weft at the holding means; circuits containing electro-magnetic devices arranged, upon energization, to respectively control the bobbin replacing means and the two severing devices; and a timing chain with lugs thereon to close the circuits through the several electro-magnetic means in governing the performance of the functions aforesaid in the proper sequence.

13. In a loom, a lay; a stationary shuttle box at each side of the loom; means for actuating the lay with provision of protracted rest periods in retracted position; a shuttle; means for throwing the shuttle across the lay alternately in opposite directions between the stationary shuttle boxes; mechanism for replenishing the weft in the shuttle while the latter rests temporarily in one of the shuttle boxes; means arranged during a dwell of the lay, to couple the weft replenishing mechanism with the lay for actuation by the latter incident to the succeeding beat stroke thereof; and actuating means for said coupling means.

14. In a loom, a lay; a stationary shuttle box at each side of the loom; a shuttle; means for throwing the shuttle across the lay alternately in opposite directions between the stationary shuttle boxes; a magazine for filled bobbins; ejector means arranged to advance a filled bobbin from the magazine, and at the same time to displace an exhausted bobbin from the shuttle while the latter is temporarily resting in one of the shuttle boxes; an actuating arm; means operatively connecting the actuating arm with the ejector means; a lever fulcrumed on the lay; a circuit containing electro-magnetic means arranged, upon energization, to couple the lever with the arm aforesaid so that the ejector means is actuated incident to movement of the lay; and timing means controlling the closing of the circuit through said electro-magnetic means.

15. In a loom, a lay; a stationary shuttle box at each side of the loom; a shuttle; means for throwing the shuttle across the lay alternately in opposite directions between the stationary shuttle boxes; a magazine for filled bobbins; an ejector arranged to advance a filled bobbin from the magazine, and at the same time to displace an exhausted bobbin from the shuttle while the latter is temporarily resting in one of the shuttle boxes; an actuating arm; means operatively connecting the actuating arm with the ejector; a lever fulcrumed on the lay; a circuit containing electro-magnetic means arranged, upon energization, to couple the lever with the arm aforesaid so that the ejector is actuated incident to movement of the lay; and a timing chain with a lug thereon adapted to close the circuit through said electro-magnetic means.

16. In a loom, a lay; a stationary shuttle box at each side of the loom; a shuttle; means for throwing the shuttle across the lay alternately in opposite directions between the stationary shuttle boxes; a magazine for filled bobbins; an ejector arranged to advance a bobbin from the magazine, and at the same time to displace an exhausted bobbin from the shuttle while the latter is temporarily resting in one of the shuttle boxes; an actuating arm; means operatively connecting the actuating arm with the ejector means; a lever fulcrumed on the lay; a circuit containing electro-magnetic means arranged, upon energization, to couple the lever with the arm aforesaid so that the ejector is actuated incident to movement of the lay; means adjacent the magazine to hold the weft ends of the stored bobbins separated; shear means arranged after the first pick of the replenished shuttle and beating up of the weft from the new bobbin therein by the lay, to sever said weft at the holding means; a circuit including electro-magnetic means arranged, upon energization, to actuate the shear means; and means governing the closing of the circuits through the two electro-magnetic devices in proper timed relation.

17. A loom according to claim 5, including means for removing the projecting strands of the severed old and new wefts from the selvage of the fabric being woven, comprising a rapidly rotating spool with projecting catch fingers, a deflector for normally keeping the weft out of the range of the catch hooks on the spool during the beat strokes of the lay, and means for temporarily moving the deflector out of the way at the time of the severances aforesaid so that the severed strands of the old and the newly laid wefts are brought into the range of the catch hooks on the spool during a current beat stroke of the lay, removed from the selvage of the fabric and wrapped on said spool.

18. A loom according to claim 5, including means for removing the projecting strands of the severed old and new wefts from the selvage of the fabric being woven, comprising a rapidly rotating spool with centrally located projecting catch fingers, stationary combs at opposite sides of the spool, a deflector for normally keeping the weft out of the range of the stationary combs and the catch hooks on the spool during the beat strokes of the lay, and means for temporarily moving the deflector out of the way at the time of the severance aforesaid so that the severed strands of the old and the newly laid wefts are advanced into the combs and brought centrally into the range of the catch hooks of the spool during a current beat of the lay, removed from the fabric selvage, and the ends of the severed strands wrapped on the spool at opposite sides of the catch hooks incident to reeving through the combs.

19. In a double shuttle loom, a lay; means for actuating the lay with provision of protracted dwell periods in the retracted positions; a stationary shuttle box with two superposed vertically-aligned shuttle compartments at each side of the loom; a pair of shuttles; means for concurrently throwing the shuttles in opposite directions across the lay between corresponding compartments of the respective shuttle boxes; mechanism for vertically replenishing the weft in the shuttles while the latter temporarily rest respectively and successively at different times in their respective compartments in one of the shuttle boxes; and means for selectively coupling the replenishing mechanism with the lay for actuation by the latter to effect bobbin replacements in the respective shuttles as aforesaid.

20. In a double shuttle loom, a lay; a shuttle box with two superposed vertically-aligned shuttle compartments at each side of the loom; a pair of shuttles; means for concurrently throwing the shuttles in opposite directions across the lay between corresponding compartments of the respective shuttle boxes; a gravity feed magazine for filled bobbins; an ejecting plunger for thrusting individual bobbins from the magazine into the shuttles at different times while the latter temporarily rest in their respective compartments respectively and successively in one of the shuttle boxes; means for releasing individual bobbins in the magazine to move into position beneath said plunger in readiness for ejection; means for severing the weft end of substantially-exhausted bobbins in the shuttles incident to bobbin changes; and means deriving movement from the lay to actuate the ejecting plunger and the bobbin release means of the magazine, as well as the weft severing means aforesaid.

21. In a double shuttle loom, a lay; a shuttle box with a pair of superposed vertically-aligned shuttle compartments at each side of the loom; a pair of shuttles; means for concurrently throwing the shuttles across the lay in opposite directions between corresponding compartments of the respective shuttle boxes; a magazine for filled bobbins; an ejecting plunger for advancing individual bobbins from the magazine to replace exhausted bobbins in the shuttles; an arm for actuating the plunger; projections on said arm at different distances from its fulcrum axis; a pair of coupling hook levers on the lay adapted to respectively engage the projections on the arm aforesaid; and automatic means for selectively controlling the coupling of the hook levers with the arm for impartation of short and long strokes to the ejecting plunger incident to substitution of bobbins in the respective shuttles at different times, while they temporarily rest respectively and successively in their respective compartments in one of the shuttle boxes.

22. In a double shuttle loom, a lay; a stationary shuttle box with a pair of superposed vertically-aligned shuttle compartments at each side of the loom; a pair of shuttles; means for concurrently throwing the shuttles across the lay in opposite directions between corresponding compartments of the respective shuttle boxes; a magazine for filled bobbins; an ejecting plunger for advancing individual bobbins from the magazine to replace exhausted bobbins in the shuttles; an arm for actuating the plunger; projections on the arm at different distances from its fulcrum axis; a pair of hook levers on the lay adapted to engage the projections on the arm aforesaid; circuits containing electro-magnetic devices for respectively actuating the hook levers; and automatic means for closing the circuits through the magnetic devices selectively to control the coupling of the hook levers with the arm for impartation of short and long strokes to the ejecting plunger incident to substitution of bobbins in the shuttles at different times while the latter respectively and successively rest in their respective compartments in one of the shuttle boxes.

23. In a double shuttle loom, a lay; a shuttle box with two superposed vertically-aligned shuttle compartments at each side of the loom; a pair of shuttles; means for concurrently throwing the shuttles across the lay in opposite directions between corresponding compartments of the respective shuttle boxes; a gravity feed magazine for filled bobbins associated with one of the shuttle boxes; a vertical displacing plunger in the magazine; means arranged to release the lowermost bobbin in the magazine to move into position beneath the plunger; a rock shaft with connections respectively to the plunger and the release means; an arm on the rock shaft, said arm having projections at different distances from the rock shaft, a pair of coupling hook levers on the lay adapted to respectively engage the projections on the arm; means for coupling the hook levers with the arm; and automatic means for selectively controlling such coupling for impartation of short and long strokes to the ejecting plunger incident to substitution of bobbins in the shuttles respectively and successively at different times through movement derived from the lay, with attendant operation of the release means aforesaid each time.

24. In a double shuttle loom, a stationary shuttle box with a pair of superposed vertically-aligned shuttle compartments at each side of the loom; a pair of shuttles; means for concurrently throwing the shuttles across the loom in opposite directions between corresponding compartments of the respective shuttle boxes; a magazine for filled bobbins above one of the shuttle boxes; means automatically operative at different times to effect downward replacement of substantially-exhausted bobbins in the respective shuttles by filled ones from the magazine while the shuttles respectively and successively rest temporarily in their respective compartments in the shuttle box below said magazine.

25. In a double shuttle loom, a shuttle box with a pair of superposed shuttle compartments at each side of the loom; a pair of shuttles adapted to be concurrently thrown across the loom in opposite directions between corresponding compartments of the respective shuttle boxes; a magazine for filled bobbins above one of the shuttle boxes; means automatically operative at different times to effect replacement of substantially-exhausted bobbins in the shuttles by filled ones from the magazine while the shuttles respectively rest temporarily in the box below said magazine; means for severing the yarns of the substantially-exhausted bobbins in the shuttles incident to the bobbin substitutions including an arm fulcrumed to said shuttle box, a pair of parrot beak shear devices, one for each shuttle, independent supports for the shear devices pivoted to swing laterally of the two shuttle box compartments and having shanks engaging apertures in said arm; and means for automatically actuating said arm to concurrently swing the two shear devices inward, so that the shear device for the particular shuttle which happens to be in the box at the time, is thrust through an aperture in the corresponding side of such shuttle and closed by camming with said aperture to sever the yarn of the nearly exhausted bobbin at the time a bobbin change is effected.

26. In a double shuttle loom, a lay; a shuttle box with a pair of superposed shuttle compartments at each side of the loom; a pair of shuttles adapted to be concurrently thrown across the lay between corresponding compartments of the respective shuttle boxes; a magazine for filled bobbins; ejecting means for thrusting filled bobbins from the magazine to replace substantially exhausted bobbins in the shuttles at different times while the latter respectively rest in one of the shuttle boxes; means associated with the magazine to hold the free warp ends of the stored bobbins separated against entanglement; means for severing the weft ends of the substantially-exhausted bobbins within the shuttles incident to bobbin changes; a common means for simultaneously actuating the ejecting means and the severing means, including an actuating arm; a pair of hook levers on the lay adapted to be coupled with projections at different distances from the fulcrum of the actuating arm for impartation of short and long strokes to the ejecting means to place the replenishing bobbins in the respective shuttles; selective electro-magnetic devices to effect coupling of the hook levers with the actuating arm aforesaid; means for severing the weft ends of the replenished shuttles at the holding means aforesaid upon the first picks of the shuttles following the bobbin changes; electro-magnetic means for actuating the last mentioned severing means; and timing means to govern closure of circuits through the several electro-magnetic devices.

27. A double shuttle loom in accordance with claim 26, wherein the timing means comprises a chain with spaced lugs; and contacts in energizing circuits for the several magnetic devices adapted to be successively wiped by the lugs of said chain.

28. In a double shuttle loom, a lay; a shuttle box with two superposed vertically-aligned shuttle compartments at each side of the loom; a pair of shuttles; means for concurrently throwing the shuttles across the lay in opposite directions between corresponding compartments of the respective shuttle boxes; a magazine for filled bobbins on one side of the loom; and means movable to two different extents relatively to said shuttle compartments to vertically replace bobbins in the respective shuttles with filled bobbins from the magazine at different times while said shuttles respectively rest temporarily in their respective compartments in one of the shuttle boxes; means for selecting in which of either shuttle compartment a shuttle is to be replenished and actuating means for the movable means whereby to transfer a bobbin into a shuttle in the selected compartment.

29. A double shuttle loom in accordance with claim 28 including automatic means for severing the wefts of the substantially-exhausted bobbins at the shuttles as the bobbin changes are effected.

30. A double shuttle loom in accordance with claim 28 including automatic means for severing the wefts of the substantially exhausted bobbins at the shuttles as the bobbin changes are effected and means for removing the severed strands of the old weft from the selvedge of the fabric being woven.

31. A double shuttle loom in accordance with claim 28 including means in association with the magazine to hold the free weft ends of the stored bobbins separated against entanglement; and automatic means for severing the weft ends of the substituted bobbins at the holding means after the first picks respectively of the replenished shuttles.

32. A double shuttle loom in accordance with claim 28 including means in association with the magazine to hold the free weft ends of the stored bobbins separated against entanglement; automatic means for severing the weft ends of the substituted bobbins at the holding means after the first picks respectively of the replenished shuttles; and automatic means for removing the severed projecting strands of the old and the new wefts from the selvedge of the fabric being woven.

33. In a loom, a pair of automatic weft replenishing bobbin shuttles; picking mechanism for picking the shuttles oppositely and simultaneously across the loom; a shuttle box at one side of the loom having a pair of superposed vertically-aligned shuttle compartments, and a straight bobbin passage extending therethrough, for boxing the shuttles; a bobbin support; means having two different extents of movement for engaging a bobbin on the support and transferring it vertically into a shuttle in either compartment of the shuttle box and means for giving said first named means either of the selected extents of movement and means for governing said selection.

34. In a loom, a pair of automatic weft replenishing bobbin shuttles; picking mechanism for picking the shuttles oppositely and simultaneously across the loom; a stationary shuttle box at one side of the loom having a pair of superposed vertically-aligned shuttle compartments, and a straight bobbin passage extending therethrough, for boxing the shuttles; a bobbin support; means for engaging a bobbin on the support and transferring it vertically into a shuttle in either compartment of the shuttle box and means for giving said first named means either of the selected extents of movement and means for governing said selection.

35. In a multiple shed loom, a pair of shuttles; a shuttle box at one side of the loom having an upper and under superposed vertically-aligned shuttle compartment, with a vertical opening extending continuously therethrough; weft replenishing mechanism including a movable bobbin displacing member for transferring it to different extents into the vertical opening of the shuttle box in selectively replenishing exhausted individual shuttles respectively in the respective compartments; means for giving said bobbin displacing member either of the selected extents of movement and means for governing said selection.

36. In a multiple shed loom, a pair of shuttles; a shuttle box at one side of the loom having a pair of superposed vertically-aligned shuttle compartments with a substantially straight vertical opening extending continuously therethrough; weft replenishing mechanism including a bobbin displacing member arranged to be passed into the vertical opening of the shuttle box; and a pivoted actuating element arranged to give said member two different extents of movement to force a bobbin into the shuttle box in selectively replenishing exhausted individual shuttles respectively in the respective compartments; means for giving said pivoted actuating element either of the selected extents of movement and means for governing said selection.

37. In a multiple shed loom, a lay; a pair of shuttles; a shuttle box at one side of the loom having two superposed vertically-aligned shuttle compartments with a straight vertical opening extending continuously therethrough; weft replenishing mechanism including a member arranged to be moved by the lay to different extents into the vertical opening of the shuttle box in selectively replenishing exhausted individual shuttles respectively in the respective compartments; means for giving said member either of the selected extents of movement and means for governing said selection.

38. In a loom, a pair of automatic weft replenishing bobbin shuttles; a shuttle box at one side of the loom, having a pair of superposed vertically-aligned compartments for boxing the shuttles; a bobbin support; means movable to either of two extents to engage a bobbin on the support and to transfer it vertically into a shuttle in either of the compartments of the shuttle box; means for giving said first named means either of the two extents of movement and means for governing the extent of movement.

39. In a loom, a pair of automatic weft replenishing bobbin shuttles; a shuttle box at one side of the loom, having a pair of superposed vertically-aligned compartments for boxing the shuttles; a bobbin support; means to engage a bobbin on the support and to transfer it vertically into a shuttle in either of the compartments of the shuttle box; means to be selected for predetermining the extent of movement of the said bobbin engaging means; means to select said predetermining means and means for actuating said selected means and the bobbin engaging means.

40. In a double shuttle loom, a shuttle box at one side of the loom, having a pair of superposed vertically-aligned compartments and a continuous vertical bobbin passage therethrough; a bobbin transfer means arranged to pass down through the upper compartment and beyond to an extent sufficient to transfer a bobbin into a shuttle in the lower compartment; means for selecting the time of such passage and actuating means for said bobbin transfer means.

41. In a loom, a pair of automatic weft replenishing shuttles; picking mechanism for picking the shuttles oppositely and simultaneously across the loom; a shuttle box at one side of the loom, having a pair of aligned shuttle compartments and a straight bobbin passage extending therethrough, for boxing the shuttles; a bobbin support; means movable to either of two extents to engage a bobbin on the support and to transfer it into a shuttle in either of the compartments of the shuttle box; means for giving said first named means either of the two extents of movement and means for governing the extent of movement.

WHITWORTH F. BIRD.
WILLIAM R. HEWTON.